United States Patent
Kutz et al.

(10) Patent No.: US 12,432,780 B2
(45) Date of Patent: Sep. 30, 2025

(54) SCHEMES FOR CHANNEL AWARE TONE RESERVATION CONTENTION WITH REFERENCE SIGNALS

(71) Applicant: QUALCOMM Incorporated, San Diego, CA (US)

(72) Inventors: Gideon Shlomo Kutz, Ramat Hasharon (IL); Idan Michael Horn, Hod Hasharon (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 18/161,803

(22) Filed: Jan. 30, 2023

(65) Prior Publication Data

US 2024/0260085 A1 Aug. 1, 2024

(51) Int. Cl.
 *H04W 74/08* (2024.01)
 *H04W 74/0816* (2024.01)

(52) U.S. Cl.
 CPC ................. *H04W 74/0816* (2013.01)

(58) Field of Classification Search
 CPC .................................. H04W 74/0816
 See application file for complete search history.

(56) References Cited

U.S. PATENT DOCUMENTS

| | | | | |
|---|---|---|---|---|
| 2017/0288759 | A1* | 10/2017 | Namgoong | H04L 25/0212 |
| 2018/0026764 | A1* | 1/2018 | Namgoong | H04B 7/0413 370/329 |
| 2018/0199373 | A1* | 7/2018 | Yang | H04W 74/0808 |
| 2020/0022120 | A1* | 1/2020 | Liu | H04B 7/0473 |

\* cited by examiner

*Primary Examiner* — Walli Z Butt
(74) *Attorney, Agent, or Firm* — Holland & Hart LLP

(57) ABSTRACT

Methods, systems, and devices for wireless communications are described. The techniques described herein relate to schemes for channel aware tone reservation (CATR) contention with a reference signal. A network entity determines, based on a reference signal pattern, a reference signal resource element within a first slot of a channel for transmitting a reference signal. The network entity determines, based on a CATR pattern, an initial CATR resource element. The CATR pattern is based on a channel frequency response of the channel. The network entity determines a CATR resource element based on the reference signal resource element, the initial CATR resource element, and a resource element scheme of multiple resource element schemes. The multiple resource element schemes resolve a contention between an overlap of the reference signal resource element and the initial CATR resource element. The network entity transmits an indication of the CATR resource element to a user equipment.

30 Claims, 14 Drawing Sheets

SCHEMES FOR CHANNEL AWARE TONE RESERVATION CONTENTION WITH REFERENCE SIGNALS

FIELD OF TECHNOLOGY

The following relates to wireless communications, including schemes for channel aware tone reservation contention with reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, orthogonal frequency-division multiplexing (OFDM) may be used as a type of transmission. The ODFM transmission includes encoding digital data on multiple subchannel and is often used for high-data usage applications. However, OFDM transmissions are associated with high Peak-to-Average Power Ratio (PAPR), and a high PAPR may lead to nonlinear amplification of signals and reduced power efficiency. Tone reservation techniques may be used to reduce PAPR. However, the subcarrier frequencies used for the TRs may overlap or collide with subcarrier frequencies used for reference signals, resulting in channel estimation degradation.

SUMMARY

The described techniques relate to improved methods, systems, devices, and apparatuses that support schemes for channel aware tone reservation (CATR) contention with reference signals. A network entity may determine a CATR by determining a resource element for a tone reservation based on an awareness of a resource element (e.g., time and frequency resource) for the reference signal. The network entity resolves a contention between the colliding tone reservation and the reference signal based on schemes or rules. These schemes may be implemented at the network entity or communicated to the UEs to prevent or resolve for the potential collision.

A method for wireless communications at a network entity is described. The method may include determining, based on a reference signal pattern, a reference signal resource element within a first slot of a channel for transmitting a reference signal, determining, based on a CATR pattern, an initial CATR resource element for a tone reservation, the CATR pattern based on a channel frequency response of the channel, determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element, and transmitting an indication of the CATR resource element to a UE.

An apparatus for wireless communications at a network entity is described. The apparatus may include a processor, memory coupled with the processor, and instructions stored in the memory. The instructions may be executable by the processor to cause the apparatus to determine, based on a reference signal pattern, a reference signal resource element within a first slot of a channel for transmitting a reference signal, determine, based on a CATR pattern, an initial CATR resource element for a tone reservation, the CATR pattern based on a channel frequency response of the channel, determine a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element, and transmit an indication of the CATR resource element to a UE.

Another apparatus for wireless communications at a network entity is described. The apparatus may include means for determining, based on a reference signal pattern, a reference signal resource element within a first slot of a channel for transmitting a reference signal, means for determining, based on a CATR pattern, an initial CATR resource element for a tone reservation, the CATR pattern based on a channel frequency response of the channel, means for determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element, and means for transmitting an indication of the CATR resource element to a UE.

A non-transitory computer-readable medium storing code for wireless communications at a network entity is described. The code may include instructions executable by a processor to determine, based on a reference signal pattern, a reference signal resource element within a first slot of a channel for transmitting a reference signal, determine, based on a CATR pattern, an initial CATR resource element for a tone reservation, the CATR pattern based on a channel frequency response of the channel, determine a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element, and transmit an indication of the CATR resource element to a UE.

In some examples of the method, apparatuses, and non-transitory computer-readable medium described herein, determining the CATR resource element may include operations, features, means, or instructions for determining the initial CATR resource element, determining that the reference signal resource element overlaps with the initial CATR resource element based on the reference signal resource element and the initial CATR resource element, and determining a modified CATR resource element as the CATR resource element.

In some examples of the method, apparatuses, and non-transitory computer-readable medium described herein, determining the CATR resource element may include operations, features, means, or instructions for determining the initial CATR resource element within the first slot, determining that the reference signal resource element overlaps with the initial CATR resource element based on the reference signal resource element in the first slot and the initial CATR resource element in the first slot, and determining a modified CATR resource element as the CATR resource element, the modified CATR resource element including a resource element in the first slot that may be different than the reference signal resource element.

Some examples of the method, apparatuses, and non-transitory computer-readable medium described herein may further include operations, features, means, or instructions for determining the resource element in the first slot may be based on the resource element including data or the resource element including the reference signal multiplexed with data.

In some examples of the method, apparatuses, and non-transitory computer-readable medium described herein, determining the CATR resource element may include operations, features, means, or instructions for determining an initial reference signal resource element within the first slot, determining the initial CATR resource element within the first slot, determining that the initial reference signal resource element overlaps with the initial CATR resource element based on the initial reference signal resource element in the first slot and the initial CATR resource element in the first slot, determining the initial CATR resource element as the CATR resource element, and determining a modified reference signal resource element as the reference signal resource element.

In some examples of the method, apparatuses, and non-transitory computer-readable medium described herein, the modified reference signal resource element may be based on a modified reference signal pattern, the modified reference signal pattern adjusted dynamically based on the CATR resource element, an indication of a channel quality estimation, or both.

Some examples of the method, apparatuses, and non-transitory computer-readable medium described herein may further include operations, features, means, or instructions for determining the modified reference signal resource element includes adjusting a power level associated with the reference signal at the initial reference signal resource element.

Some examples of the method, apparatuses, and non-transitory computer-readable medium described herein may further include operations, features, means, or instructions for determining the modified reference signal resource element includes selecting a new reference signal resource element based on the reference signal pattern.

In some examples of the method, apparatuses, and non-transitory computer-readable medium described herein, determining the CATR resource element may include operations, features, means, or instructions for determining the initial CATR resource element within the first slot, determining that the reference signal resource element overlaps with the initial CATR resource element, and determining the initial CATR resource element as the CATR resource element without modifying the initial CATR resource element.

In some examples of the method, apparatuses, and non-transitory computer-readable medium described herein, a CATR at the CATR resource element punctures the reference signal at the reference signal resource element.

In some examples of the method, apparatuses, and non-transitory computer-readable medium described herein, the reference signal at the reference signal resource element punctures a CATR at the CATR resource element.

In some examples of the method, apparatuses, and non-transitory computer-readable medium described herein, determining the CATR resource element may include operations, features, means, or instructions for determining that the reference signal resource element overlaps with the initial CATR resource element, determining a resource element different than the reference signal resource element as the CATR resource element, and adjusting a power level associated with the reference signal at the reference signal resource element.

A method for wireless communications at a UE is described. The method may include receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap, performing a channel quality estimation based on the CATR at the CATR resource element and the reference signal at the reference signal resource element, and transmitting the channel quality estimation to the network entity.

An apparatus for wireless communications at a UE is described. The apparatus may include a processor, memory coupled with the processor, and instructions stored in the memory. The instructions may be executable by the processor to cause the apparatus to receive, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap, perform a channel quality estimation based on the CATR at the CATR resource element and the reference signal at the reference signal resource element, and transmit the channel quality estimation to the network entity.

Another apparatus for wireless communications at a UE is described. The apparatus may include means for receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap, means for performing a channel quality estimation based on the CATR at the CATR resource element and the reference signal at the reference signal resource element, and means for transmitting the channel quality estimation to the network entity.

A non-transitory computer-readable medium storing code for wireless communications at a UE is described. The code may include instructions executable by a processor to receive, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap, perform a channel quality estimation based on the CATR at the CATR resource element and the reference signal at the reference signal resource element, and transmit the channel quality estimation to the network entity.

In some examples of the method, apparatuses, and non-transitory computer-readable medium described herein, receiving, from the network entity, the signal indicating the CATR resource element may include operations, features, means, or instructions for receiving the signal indicating the CATR resource element based on the initial CATR resource element within the first slot, receiving the signal indicating the CATR resource element based on the reference signal resource element overlapping with the initial CATR resource element based on the reference signal resource element in the first slot and the initial CATR resource element in the first slot, and receiving the signal indicating the CATR resource element based on a modified CATR resource element as the CATR resource element, the modified CATR resource element including a resource element in a second slot different than the first slot.

In some examples of the method, apparatuses, and non-transitory computer-readable medium described herein, receiving, from the network entity, the signal indicating the CATR resource element may include operations, features, means, or instructions for receiving the signal indicating the CATR resource element may be based on the initial CATR resource element within the first slot, receiving the signal indicating the CATR resource element may be based on the reference signal resource element overlapping with the initial CATR resource element based on the reference signal resource element in the first slot and the initial CATR resource element in the first slot, and receiving the signal indicating the CATR resource element may be based on a modified CATR resource element as the CATR resource element, the modified CATR resource element including a resource element in the first slot that may be different than the reference signal resource element.

Some examples of the method, apparatuses, and non-transitory computer-readable medium described herein may further include operations, features, means, or instructions for receiving the signal indicating the CATR resource element may be based on the initial CATR resource element within the first slot based on the resource element including data or the resource element including the reference signal multiplexed with data.

In some examples of the method, apparatuses, and non-transitory computer-readable medium described herein, receiving, from the network entity, the signal indicating the CATR resource element may include operations, features, means, or instructions for receiving the signal indicating the CATR resource element based on an initial reference signal resource element within the first slot, receiving the signal indicating the CATR resource element based on the initial CATR resource element within the first slot, receiving the signal indicating the CATR resource element based on the initial reference signal resource element overlapping with the initial CATR resource element based on the initial reference signal resource element in the first slot and the initial CATR resource element in the first slot, receiving the signal indicating the CATR resource element based on the initial CATR resource element as the CATR resource element, and receiving the signal indicating the CATR resource element based on a modified reference signal resource element as the reference signal resource element.

In some examples of the method, apparatuses, and non-transitory computer-readable medium described herein, the modified reference signal resource element may be based on a modified reference signal pattern, the modified reference signal pattern adjusted dynamically based on the CATR resource element, an indication of the channel quality estimation, or both.

Some examples of the method, apparatuses, and non-transitory computer-readable medium described herein may further include operations, features, means, or instructions for receiving the signal indicating the CATR resource element based on the modified reference signal resource element including adjusting a power level associated with the reference signal at the initial reference signal resource element.

Some examples of the method, apparatuses, and non-transitory computer-readable medium described herein may further include operations, features, means, or instructions for receiving the signal indicating the CATR resource element based on the modified reference signal resource element including selection of a new reference signal resource element based on a reference signal pattern.

In some examples of the method, apparatuses, and non-transitory computer-readable medium described herein, receiving, from the network entity, the signal indicating the CATR resource element may include operations, features, means, or instructions for receiving the signal indicating the CATR resource element based on the initial CATR resource element within the first slot, receiving the signal indicating the CATR resource element based on the reference signal resource element overlapping with the initial CATR resource element, and receiving the signal indicating the CATR resource element based on the initial CATR resource element as the CATR resource element without a modification of the initial CATR resource element.

In some examples of the method, apparatuses, and non-transitory computer-readable medium described herein, the CATR at the CATR resource element punctures the reference signal at the reference signal resource element.

In some examples of the method, apparatuses, and non-transitory computer-readable medium described herein, the reference signal at the reference signal resource element punctures the CATR at the CATR resource element.

DETAILED DESCRIPTION

Figure 1:
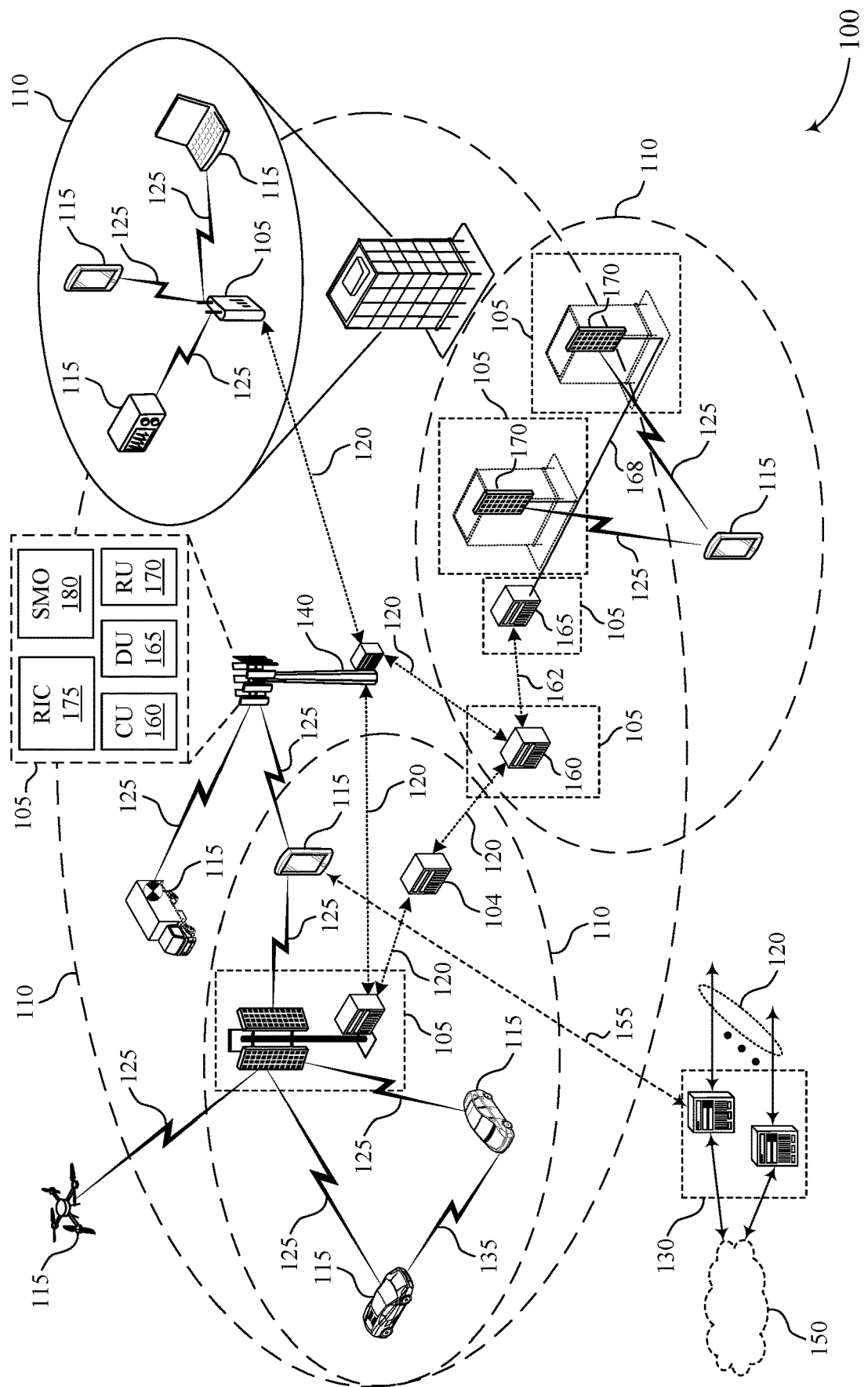
FIG. 1 illustrates an example of a wireless communications system that supports schemes for channel aware tone reservation (CATR) contention with reference signals in accordance with one or more aspects of the present disclosure.

In some wireless communications systems, orthogonal frequency-division multiplexing (OFDM) may be used as a type of transmission. The ODFM transmission includes encoding digital data on multiple subchannel frequencies (rather than a single wideband frequency channel) and is often used for high-data usage applications. However, OFDM transmissions are associated with high Peak-to-Average Power Ratio (PAPR), and a high PAPR may lead to nonlinear amplification of signals and reduced power efficiency. Tone reservation techniques may be used to reduce PAPR. Tone reservation techniques may utilize unused or reserved subcarrier frequencies for peak-canceling or peak-reduction signals that lower the PAPR of an OFDM signal. However, these subcarrier frequencies for the tone reservation may overlap or collide with subcarrier frequencies used for reference signals that may be used for channel estimation quality.

A network entity may determine CATR by determining a resource element (e.g., time and frequency resource) for a tone reservation based on an awareness of a resource element for the reference signal. The network entity may resolve a contention between the colliding tone reservation and the reference signal based on schemes or rules. These resource element schemes may be implemented at the network entity or may be communicated to user equipments (UEs) to prevent or resolve for the potential collision.

The schemes may include that no CATR may be located at a reference signal resource element, such as within the same slot or symbol. For example, if an initial or proposed CATR resource element collides with a reference signal resource element (e.g., a slot or a symbol within the same slot), then the CATR may not be located at the initial CATR resource element. The schemes may include that no CATR may be located at a reference signal symbol but may be located in the same slot. The schemes for the CATR located in the same slot may vary based on whether the initial CATR resource element includes a data symbol or a multiplexed reference signal symbol that includes the reference signal multiplexed with data. The schemes may include that no CATR may be located at a reference signal symbol and that a CATR may be located at a data symbol or a multiplexed reference signal symbol. The schemes may include that no CATR may be located at a reference signal symbol or a multiplexed reference signal symbol. In some examples, the schemes may include that a CATR may be located at a reference signal symbol or a reference signal slot. In some examples, when a CATR is at a reference signal symbol or a reference signal slot, the reference signal resource element may be modified. For example, the power level associated with the reference signal may be adjusted. The reference signal resource element may be modified based on a new reference signal pattern. The reference signal resource element may be modified by selecting a new resource element available based on a reference signal pattern (e.g., nearest reference signal symbol). When a CATR is located at a reference signal symbol or a reference signal slot, the CATR may punctured by the reference signal or the reference signal may be punctured by the CATR.

Aspects of the disclosure are initially described in the context of wireless communications systems. Aspects of the disclosure are further illustrated by and described with reference to apparatus diagrams, system diagrams, and flowcharts that relate to schemes for CATR with reference signals.

FIG. 1 illustrates an example of a wireless communications system 100 that supports schemes for channel aware tone reservation contention with reference signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support schemes for channel aware tone reservation contention with reference signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 may a CATR by determining a resource element for a tone reservation based on an awareness of a resource element (e.g., time and frequency resource) for the reference signal. The network entity 105 may resolve a contention between the colliding tone reservation and the reference signal based on schemes or rules. These schemes may be communicated to the UEs 115 to prevent or resolve for the potential collision.

The schemes may include that no CATR may be located at a reference signal resource element, such as within the same slot or symbol. For example, if an initial or proposed CATR resource element collides with a reference signal slot or a reference signal symbol within the same slot, then the CATR may not be located at the initial CATR resource element. The schemes may include that no CATR may be located at a reference signal symbol but may be located in the same slot. The schemes for the CATR located in the same slot may vary based on whether the initial CATR resource element includes a data symbol or a multiplexed reference signal symbol that includes the reference signal multiplexed with data. The schemes may include that no CATR may be located at a reference signal symbol and that a CATR may be located at a data symbol or a multiplexed reference signal symbol. The schemes may include that no CATR may be located at a reference signal symbol or a multiplexed reference signal symbol. In some examples, the schemes may include that a CATR may be located at a reference signal symbol or a reference signal slot. In some examples, when a CATR is at a reference signal symbol or a reference signal slot, the reference signal resource element may be modified. For example, the power level associated with the reference signal may be adjusted. The reference signal resource element may be modified based on a new reference signal pattern. The reference signal resource element may be modified by selecting a new resource element available based on a reference signal pattern (e.g., nearest reference signal symbol). When a CATR is located at a reference signal symbol or a reference signal slot, the CATR may punctured by the reference signal or the reference signal may be punctured by the CATR.

Figure 2:
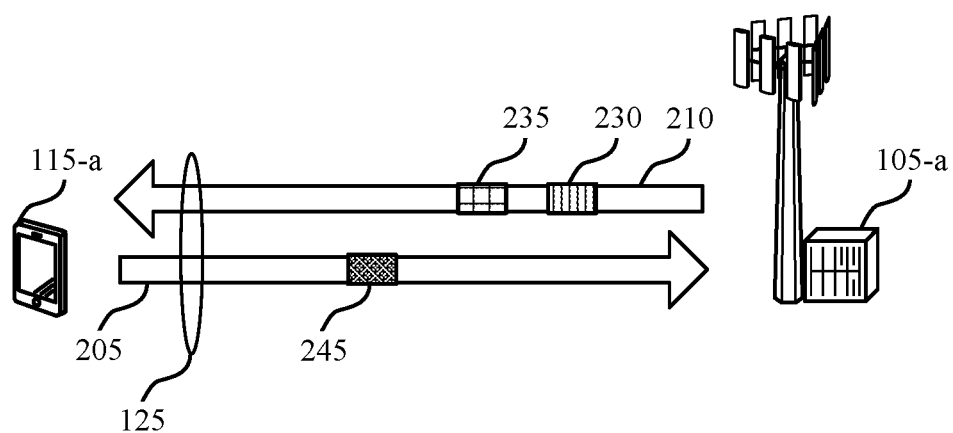
FIG. 2 illustrates another example of a wireless communications system that supports schemes for CATR contention with reference signals in accordance with one or more aspects of the present disclosure.

FIG. 2 illustrates another example of a wireless communications system 200 that supports schemes for CATR contention with reference signals in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 described with respect to FIG. 1. The wireless communications system 200 also includes a network entity 105-a, which may be an example of a network entity 105 as described with respect to FIG. 1.

The network entity 105-a may communicate with the UE 115-a using a communication link 125. The communication link 125 may be an example of an NR or LTE link between the UE 115-a and the network entity 105-a. The communication link 125 may include a bi-directional link that enables both uplink and downlink communications. For example, the UE 115-a may transmit uplink signals 205 (e.g., uplink transmissions), such as uplink control signals or uplink data signals, to the network entity 105-a using the communication link 125 and the network entity 105-a may transmit downlink signals 210 (e.g., downlink transmissions), such as downlink control signals or downlink data signals, to the UE 115-a using the communication link 125.

In millimeter wave (mmWave) (e.g., frequency range 2 (FR2)) and Sub-THz (e.g., at least frequency range 4 (FR34)) frequencies, the bandwidth sizes may be above 1 gigahertz (GHz), which may facilitate large subcarrier spacing (SCS), for example, up to 1 megahertz (MHz). This large SCS may linearly decrease reference signal symbol latency (e.g., slot latency). RF power consumption in such frequencies may be large, for example, including thousands of watts consumed by the power amplifiers (PAs) of the network entities 105.

In some examples, a resource element (e.g., location) may be reserved for a tone reservation, where the resource element for the tone reservation is based on a low frequency response of a channel (e.g., "weak" areas of channel, where the channel has low energy or capacity relative to other areas of the channel). A determination of a low frequency response may be based on a demodulation reference signal (DMRS) or a channel state information reference signal (CSI-RS) channel estimation, or based on an estimation from the network entity 105-a based on a sounding reference signal (SRS), a physical uplink channel (PUSCH) DMRS, and the like. The selection of the resource element for the tone reservation may change over time based on changes in the channel. The tone reservation resource element may be sent using side information (e.g., from transmitter to receiver), may be estimated by the UE 115-a, or a combination of both.

In some examples, the CATRs discussed herein may be used for network energy saving in 3GPP Release 18 (Rel-18).

In some examples, the selected CATR resource elements or frequency domain locations having a low frequency response may collide or overlap with resource elements that are dedicated for reference signals, for example, reference signal symbols. The potential collision may cause degradation of the channel estimation or increased complexity for channel estimation functionality at the receiver (e.g., UE 115-a). In some examples, the tone reservation may be used to reduce PAPR and the initial selection of the tone reservation may be a null location of the channel. As discussed herein, the resource element schemes may be used for handling possible contention between a tone reservation and a reference signal, such that the selection of a resource element for a tone reservation is channel-aware and takes into consideration the reference signal.

The network entity 105-a may transmit an indication of a reference signal resource element 230 (e.g., time and frequency resource). The reference signal may be a DMRS signal or the like. The network entity 105-a may also transmit an indication of a CATR resource element 235. That is, the network entity 105-a may determine an initial resource element for a tone reservation (e.g., initial CATR resource element), which may be a PAPR-reducing signal. The initial resource element for the tone reservation may include a null frequency since the null frequency may include subcarriers providing low energy and thus, may not otherwise be used for transmitting data. However, the resource element for the initial tone reservation at the null frequency may collide with the reference signal resource element 230. As such, the network entity 105-a may resolve the contention between the reference signal resource element 230 and the initial tone reservation resource element. The contention may be resolved using one or more resource element schemes. The resource element schemes or rules may resolve a contention between an overlap of the reference signal resource element and the initial tone reservation resource element (e.g., overlap of resource element locations). Accordingly, the indication of the CATR resource element 235 includes the tone reservation based on the reference signal resource element 230, such that the selected resource element for the CATR is channel-aware or considers the reference signal. In some examples, the network entity 105-a may transmit the indication of the reference signal resource element 230, the initial tone reservation resource element, or both, and the UE 115-a may resolve the contention at the UE 115-a based on one or more resource element schemes. The UE 115-a may store or retrieve the resource element schemes to implement the contention resolution to determine the CATR resource element.

In some examples, the UE 115-a may transmit to the UE 115-a, an indication of UE capabilities 245 of the UE 115-a. Based on the information provided by the UE 115-a, the network entity 105-a may implement one or more of the resource element schemes or provide one or more of the resource element schemes to resolve the contention between the initial tone reservation resource element and the reference signal resource element 230. By implementing the CATR, which is a tone reservation resource element that is aware of the channel and takes into consideration the reference signal resource element, collisions between a tone reservation and a reference signal may be avoided, which may otherwise cause channel estimation degradation.

Figure 3:
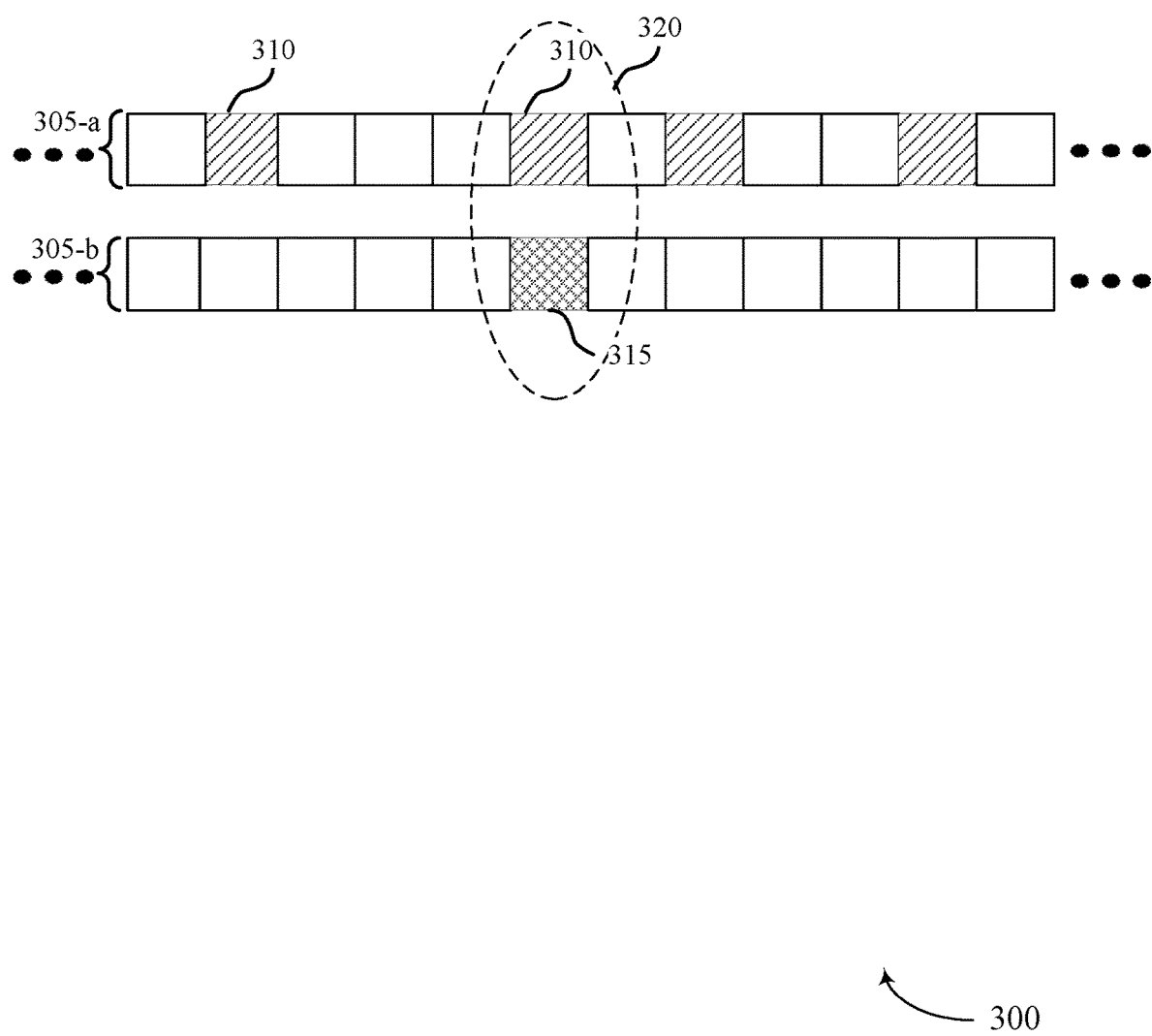
FIG. 3 illustrates an example of selected resource elements for tone reservations and reference signals that supports schemes for CATR contention with reference signals in accordance with one or more aspects of the present disclosure.

FIG. 3 illustrates an example of selected resource elements 300 for tone reservations and reference signals that supports schemes for CATR contention with reference signals in accordance with one or more aspects of the present disclosure. The selected resource elements 300 depict an example of a first set of resource elements 305-*a* of resource elements of a channel and a second set of resource elements 305-*a* of resource elements of the channel. The sets of resource elements 305 may be the same resource elements and indicate a respective reference signal pattern or a tone reservation pattern of resource elements. The first and second sets of resource elements 305 may also include fewer or more resource elements than the resource elements shown (as indicated by the ellipses).

The first set of resource elements 305-*a* may include three reference signal resource elements 310. The second set of resource elements 305-*b* may include a tone reservation resource element 315. Generally, some resource elements (e.g., subcarriers of the transmitted signal, such as OFDM symbols) used for tone reservations may be occupied with PAPR reduction signals, which are not data and may not be known to a UE 115. That is, a tone reservation algorithm may not consider or may be sensitive to which subcarriers locations are used for the PAPR reduction and in some examples, the same subcarriers may have low energy compared to data resource elements. In CATR, the selected resource elements used for conveying or transmitting the PAPR reduction signal may be selected dynamically based on the channel response to occupy the lowest power resource element, such that the resulting capacity loss is reduced or minimized. However, the selected resource element (e.g., the subcarrier) for the tone reservation and the reference signal may be the same. At the overlap 320, the tone reservation resource element 315 overlaps or collides with the reference signal resource element 310. To avoid channel estimation degradation that may be caused by a potential collision, one or more resource element schemes may be used to resolve the contention before reserving the resource element for the CATR, the reference signal, or both.

Figure 4:
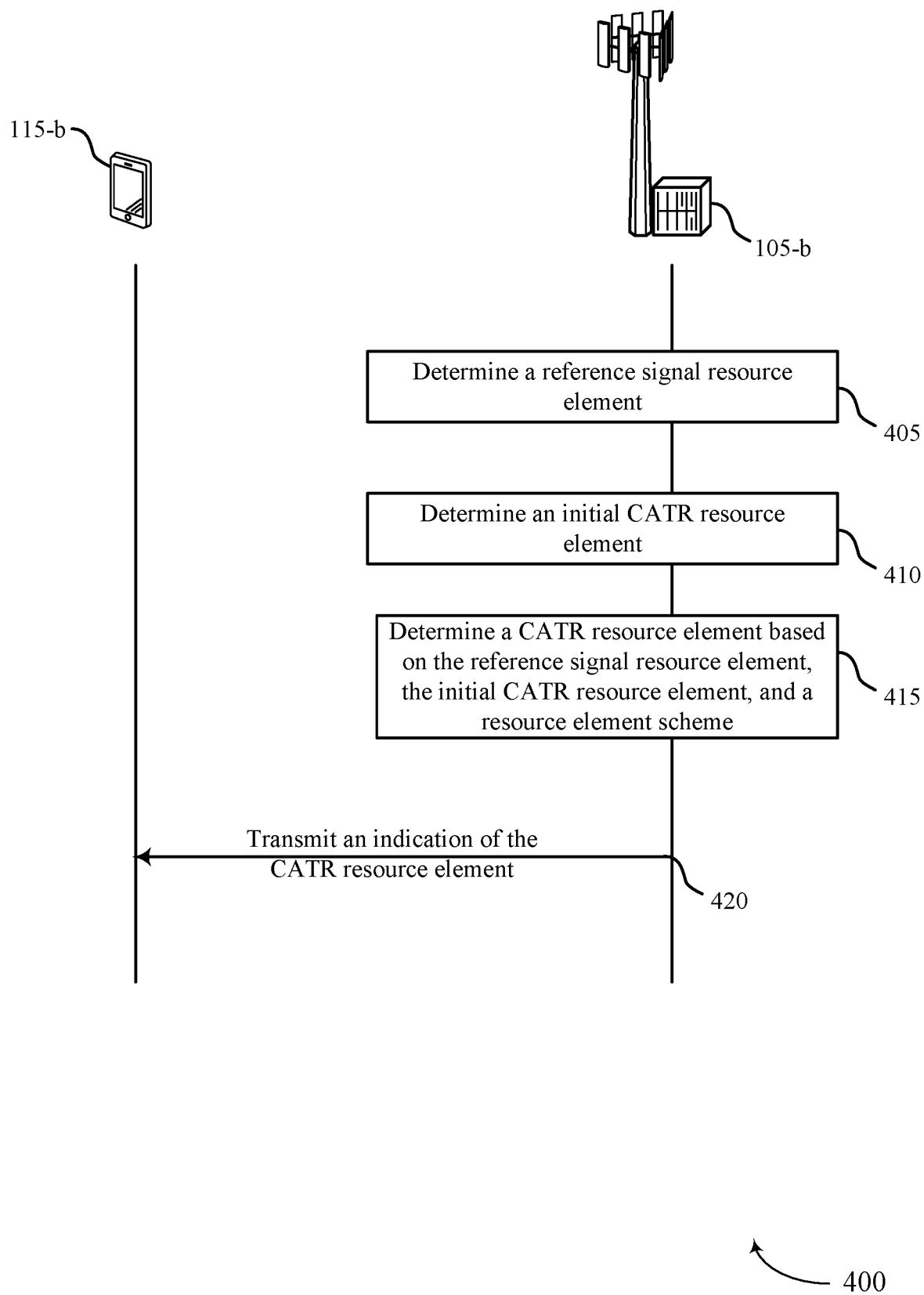
FIG. 4 illustrates an example of a process flow that supports schemes for CATR contention with reference signals in accordance with one or more aspects of the present disclosure.

FIG. 4 illustrates an example of a process flow 400 that supports schemes for channel aware tone reservation contention with reference signals in accordance with one or more aspects of the present disclosure. The process flow 400 may implement aspects of or may be implemented by aspects of the wireless communications system 100 or the wireless communications system 200. For example, the process flow 400 may include a UE 115-*b*, which may be an example of a UE 115 as described herein. The process flow 400 may include a network entity 105-*b*, which may be an example of a network entity 105 as described herein. In the following description of the process flow 400, the operations performed by the network entity 105-*b* and the UE 115-*b* may be performed in different orders or at different times than the exemplary order shown. Some operations may also be omitted from the process flow 400, or other operations may be added to the process flow 400. Further, while operations in the process flow 400 are illustrated as being performed by the network entity 105-*b* and the UE 115-*b*, the examples herein are not to be construed as limiting, as the described features may be associated with any quantity of different devices. As used herein, "resource element" or "resource elements" refers to one or more resource elements or a vector of resource elements (e.g., multiple resource elements). For example, a resource element for a CATR may refer to a vector of multiple CATR resource elements. Similarly, a resource element for a reference signal may refer to a vector of multiple reference signal resource elements. Accordingly, a contention between a CATR resource element and a reference signal resource element discussed herein may refer to a contention between the multiple resource elements of respective vectors.

At 405, the network entity 105-*b* may determine, based on a reference signal pattern, a reference signal resource element. For example, the reference signal resource element may be within a subcarrier and/or a first slot (e.g., a symbol of the first slot) for transmitting a reference signal. At 410, the network entity 105-*b* may determine, based on CATR pattern (e.g., a tone reservation pattern), an initial CATR resource element (e.g., an initial tone reservation resource element) for a tone reservation. The CATR pattern may be based on a channel frequency response of the channel. For example, the selected location or resource elements for the tone reservations may include subcarrier frequencies having low energy, which may not be useful for transmitting data.

At 415, the network entity 105-*b* may determine a CATR resource element based on the reference signal resource element, initial CATR resource element, and a resource element scheme of multiple resource element schemes. That is, any contention between the initial location of the initial CATR resource element and the reference signal resource element may be resolved for based on one or more of multiple resource element schemes discussed herein. The resource element contention may occur within the frequency domain (e.g., subcarrier) and/or the time domain (e.g., slot). In some examples, the resource element schemes used to resolve the contention may be based on UE capabilities, which may be communicated from the UE 115-*b* to the network entity 105-*b*.

At 420, the network entity 105-*b* may transmit an indication of the CATR resource element to the UE 115-*b*. That is, after the contention is resolved using the resource element schemes to avoid channel estimation degradation, the network entity 105-*b* may communicate the CATR resource element to the UE 115-*b*. Since the selected CATR resource element is based on channel awareness, such as based on the selected resource element reserved for the reference signal, the selected CATR resource element (e.g., tone reservation location) may avoid collision or channel estimation degradation caused by a collision between a tone reservation and the reference signal on the same resource element. In some examples, the network entity 105-*b* may communicate an indication of the reference signal resource element, the initial CATR resource element, and/or the resource element scheme to the UE 115-*b*, and the UE 115-*b* may implement the resource element scheme to resolve the contention. In some examples, the resource element schemes may be implemented by the network entity 105-*b*.

To resolve for the contention, one or more of the resource element schemes or rules may be implemented by the network entity 105-*a* or the UE 115-*a* before the resource elements are reserved for the CATR, the reference signal, or both. In some examples, the resource element schemes may include that the network entity 105-*b* is not to allocate CATR on tones that are used for reference signal (e.g., DMRS, CSI-RS, and the like) in any of the symbols in the slot. That is, if the initial CATR resource element overlaps or has contention with a reference signal resource element, then the resource element may not be allocated for CATR. The resource element not being allocated for CATR may occur not only at a symbol level where the contention may exist, but for all symbols in the slot even if the symbols do not have contention (e.g., no reference signal in those symbols of the slot).

In some examples, the network entity 105-*b* may inform the UE 115-*b* about this scheme, where this side information is sent from the network entity 105-*b* to the UE 115-*b* to describe that CATR resource elements (e.g., locations or tones) that may be modified accordingly. The schemes may be part of a permanent policy or may be communicated using an RRC message, medium access control (MAC) control element (CE) (MAC-CE), or a downlink control information (DCI) (e.g., signaled with a flag as part of the RRC message, MAC-CE, or DCI).

By way of example, some symbols of a slot may include DMRS (e.g., the reference signal) and other symbols of the slot may include data and no DMRS. In the symbols that include the DMRS, if there is a collision between the initial selection of the CATR and the DMRS, the CATR may not be allocated at the DMRS symbol. The CATR may also not be allocated on other symbols that do not include DMRS if they are in the same slot as the DMRS symbols. For example, if a reference signal, such as DMRS is allocated on even tones, the CATR may be placed on odd tones. Accordingly, the side information may include just the CATR locations on the odd resource elements. In some examples, such as where a SU-MIMO pattern occupies all the resource elements in a symbol, one or more schemes may be implemented at the slot level and communicated in DCI messaging. In this scheme, the same resource elements for CATR may preserved for all symbols in the slot.

Accordingly, determining the CATR resource element before transmitting the CATR resource element to the UE 115-b may involve determining the initial CATR resource element, determining that the reference signal resource element overlaps with the initial CATR resource element based on the reference signal resource element and the initial CATR resource element, and determining a modified CATR resource element as the CATR resource element (e.g., CATR at an odd tone rather than the even tone).

In some examples, the resource element scheme may include that the CATR resource element changes based on whether the initial CATR resource element includes just data or data multiplexed with a reference signal. In particular, the resource element scheme may not allocate CATR on reference signal symbols but may allocate CATR on data symbols or multiplexed symbols. The UE 115-b may use different CATR resource elements for data only symbols and for symbols where the reference signal is multiplexed with data. The schemes may include that no contention or collision of CATR and reference signal exists at the symbols with the reference signal. As such, in this scheme, the CATR is not allocated at the reference signal symbols rather than the entire slot. The CATR may be allocated at the initial CATR resource element if the initial CATR resource element includes the reference signal multiplexed with data.

In some examples, the percentage of tones used for tone reservations is maintained or is the same for both types of symbols (with and without reference signal multiplexing). In some examples, the CATR resource element pattern and reference signal resource element pattern (e.g., CATR symbols and DMRS symbols) may be fixed or predefined, reducing or minimizing overhead. In some examples, a few symbols may utilize this pattern based on the scheme, and as such, the throughput impact may be low (e.g., negligible). In some examples, the CATR resource element pattern in contention with reference signal resource element may be derived from the CATR resource elements of the data symbols. The derivation may preserve a threshold distance from the data symbols of the CATR resource element pattern while not allowing collisions of CATR resource elements and reference signal resource elements. The network entity 105-b may also inform the UE 115-b about this scheme, for example, using side information to describe the CATR resource element modifications (e.g., reserving a different resource element from the initial CATR resource element).

Accordingly, determining the CATR resource element may include determining the initial CATR resource element within the first slot, determining that the reference signal resource element overlaps with the initial CATR resource element based on the reference signal resource element in the first slot and the initial CATR resource element in the first slot, determining a modified CATR resource element as the CATR resource element. The modified CATR resource element may include a resource element in the first slot that is different than the reference signal resource element. Determining the resource element in the first slot may be based on the resource element including data or the resource element including the reference signal multiplexed with data.

The resource element scheme may include that the network entity 105-b may not allocate CATR on reference signal resource elements, such as symbols. The reference signal resource elements may be modified to reduce PAPR or peak power. That is, the CATR may not be allocated on the reference signal resource element, whether the resource element include just the reference signal or data multiplexed with the reference signal. As such, the CATR may be allocated on data symbols and modified reference signal may be allocated on the reference signal resource elements.

In some examples, the network entity 105-b may inform the UE 115-b about the one or more schemes. This scheme may be especially utilized in SU-MIMO, where the reference signal may occupy all resource elements in the data symbol and no data is multiplexed in these symbols. The reference signal may be used to reduce a PAPR pattern (e.g., Zadoff-Chu (ZC) sequences). The reference signal at the resource elements may be reduced or de-boosted to preserve peak power even though the PAPR may be higher. Reducing the power may reduce (e.g., comprise) channel estimation quality. As such, the network entity 105-b may be dynamically de-boost based on channel conditions and SNR or modulation and coding scheme (MCS) that are used. As such, in this scheme, the CATR resource element may be at just data symbols within the slot and not on symbols with reference signal multiplexed with data, and the reference signal at the reference signal resource element may be modified or reduced.

Accordingly, determining the CATR resource element may include determining an initial reference signal resource element within the first slot, determining an initial CATR resource element within the first slot, determining that the initial reference signal resource element overlaps with the initial CATR resource element based on the initial reference signal resource element in the first slot and the initial CATR resource element in the first slot, determining the initial CATR resource element as the CATR resource element, and determining a modified reference signal resource element as the reference signal resource element. The modified reference signal resource element may be based on a modified reference signal pattern, the modified reference signal pattern adjusted dynamically based on the CATR resource element, an indication of a channel quality estimation, or both. In some examples, determining the modified reference signal resource element includes adjusting a power level associated with the reference signal at the initial reference signal resource element. In some examples, determining the modified reference signal resource element includes selecting a new reference signal resource element based on the reference signal pattern.

In some examples, the resource element scheme may include that the network entity 105-*b* may use the same initial CATR resource elements for all symbols, such that contention is permitted or allowed. Specifically, the UE 115-*b* may handle the contention, such as by modifying a channel estimation algorithm at the UE 115-*b*. In this scheme, the reference signal may not be modified other than that the reference signal is punctured based on CATR pattern. The punctured tones may be known to the UE 115-*b*, where the punctured tones may be associated with low energy or capacity (since they are selected to be the CATR). This information already known or provided to the UE 115-*b* (e.g., a-priori information) may be used for enhancing the channel estimation at the UE 115-*b*. In some examples, this scheme may be implemented or applied based on a capability report from the UE 115-*b*. That is, the UE 115-*b* may communicate capability to the network entity 105-*b*, and the network entity 105-*b* may implement the scheme based on known UE capabilities.

Accordingly, determining the CATR resource element may include determining an initial CATR resource element within the first slot, determining that the reference signal resource element overlaps with the initial CATR resource element (e.g., collision or contention), and determining the initial CATR resource element as the CATR resource element without modifying the initial CATR resource element. The CATR at the CATR resource element may puncture the reference signal at the reference signal resource element.

In some examples, where the resource element scheme may include that the network entity 105-*b* may use the same initial CATR resource elements for all symbols, such that contention is permitted or allowed, the reference signal resource element may be modified to compensate for reduced channel estimation quality at the UE 115-*b*. In particular, the reference signal resource element pattern may be switched to another pattern (e.g., alternative or new pattern) or the power of the reference signal may be increased (e.g., boosted) to compensate for the punctured tones of the reference signals. For switching the pattern, the code division multiplexing (CDM) group may be changed, usage of orthogonal covering code (OCC) may be changed, the quantity of reference signal resource elements may be increased, and so forth. In some examples, the UE 115-*b* may be informed about the alternative reference signal resource element pattern, and the UE 115-*b* may switch to the alternative pattern based on the signaled CATR resource elements from the network entity 105. For example, the UE 115-*b* may determine whether a contention has occurred and if not, the current reference signal resource element pattern may be used. If a contention has occurred, the alternative reference signal resource element pattern may be used. If a contention has occurred, the UE 115-*b* may search for the next available or nearest available resource element for reserving for the reference signal, and may switch to reserving this resource element. In some examples, the selection of a particular reference signal resource element pattern may be made implicitly, but the scheme may be defined and specified in the specification.

The power of the reference signal may be increased to compensate for the punctured tones of the reference signal. The power increase or boost may be defined, for example, based on the quantity of colliding resource elements. By way of example, the scheme may include a threshold, such as for colliding tones above a threshold (e.g., more than x % of total reference signal tones in a symbol) or the reference signal at the resource elements may be boosted by a quantity (e.g., by Y decibels (dB)). Multiple thresholds and boosting levels may be defined. In some examples, the power increase may be defined in DCI signaling. The network entity 105-*b* may decide quantity of power increase based on one or more factors, such as channel coherence bandwidth, SNR, and so forth.

Accordingly, determining the CATR resource element may include determining that the reference signal resource element overlaps with the initial CATR resource element, determining a resource element different than the reference signal resource element as the CATR resource element, and adjusting a power level associated with the reference signal at the reference signal resource element.

In some examples, the resource element scheme may include that the network entity 105-*b* uses the same CATR resource elements (e.g., initial CATR resource elements that may collide with reference signal resource elements), for example, for all symbols. The reference signal resource elements to be reserved (e.g., location of the resource elements) may be changed to avoid contention. Using a different resource element may be based on a scheme or a rule derived from the original or initial reference signal resource elements and the CATR resource elements. In particular, if a contention occurs between the initial CATR resource element and the reference signal resource element, the next available or nearest resource element (e.g., location) for the reference signal may be used, and as such, the resource element used for the reference signal may be switched to the new resource element (e.g., new location). One or more databases (e.g., lists or tables) may indicate resource elements available for the reference signals and/or one or more databases may indicate resource elements available for the CATR (e.g., list of DMRS locations and list of CATR locations). If a contention exists, the lists may be used to determine the next nearest available resource element to use for the reference signal. In some examples, additional modifications to the reference signal resource elements may be implemented, such as increasing the power of the reference signal.

In some examples, the resource element schemes may include that the network entity 105-*b* uses the same CATR resource elements for all symbols, but that the CATR resource elements are punctured when colliding with the reference signal resource elements. In such examples, the network entity 105-*b* may handle the increase in PAPR, such as by changing the MCS selection, accounting for the puncture when scheduling, and so forth. Accordingly, the reference signal at the reference signal resource element may puncture the CATR at the CATR resource element. One or more of the resource element schemes may be implemented at the network entity 105-*b*, the UE 115-*b*, or both, as discussed herein, to resolve for a contention between an initial CATR resource element and the reference signal resource element. The resource element schemes may apply to various reference signal types (e.g., pilot type), such as DMRS, phase tracking reference signal (PTRS), CSI-RS, synchronization signal block (SSB), and the like. The schemes may be communicated in RRC messages. For example, SSB slots may not be impacted by CATR, and as such, the resource element scheme where the network entity 105-*b* is not allocating CATR on tones used for reference signals in any symbols in the slot, may be implemented. In other examples, one or more of the resource element schemes may be applied to resolve a contention.

Figure 5:
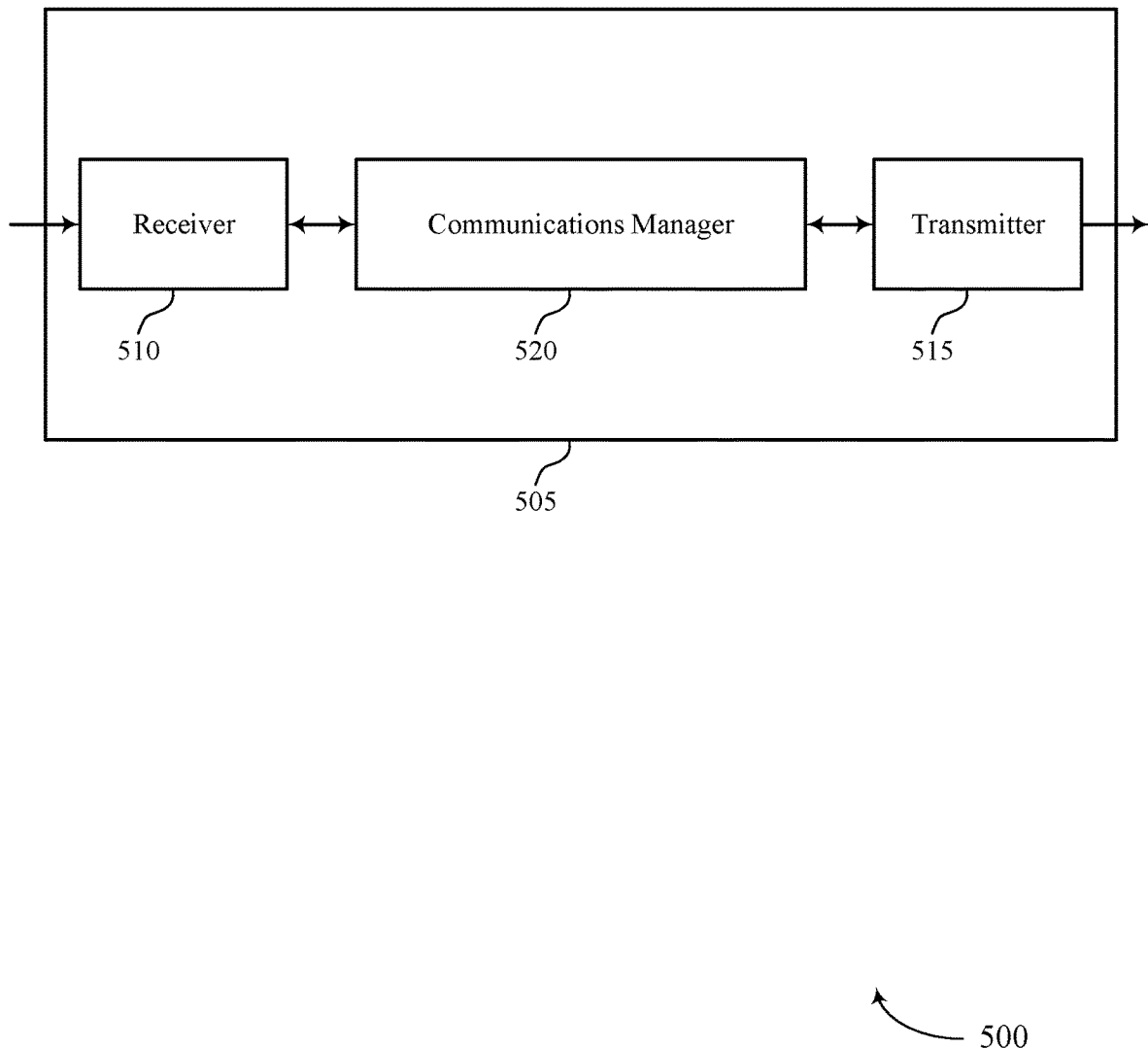
FIGS. 5 and 6 illustrate diagrams of devices that support schemes for CATR contention with reference signals in accordance with one or more aspects of the present disclosure.

FIG. 5 illustrates a diagram 500 of a device 505 that supports schemes for channel aware tone reservation contention with reference signals in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of schemes for channel aware tone reservation contention with reference signals as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a network entity in accordance with examples as disclosed herein. For example, the communications manager 520 may be configured as or otherwise support a means for determining, based on a reference signal pattern, a reference signal resource element within a first slot of a channel for transmitting a reference signal. The communications manager 520 may be configured as or otherwise support a means for determining, based on a CATR pattern, an initial CATR resource element for a tone reservation, the CATR pattern based on a channel frequency response of the channel. The communications manager 520 may be configured as or otherwise support a means for determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element. The communications manager 520 may be configured as or otherwise support a means for transmitting an indication of the CATR resource element to a UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reducing or preventing potential channel estimation degradation otherwise caused by CATR resource elements colliding with reference signal resource elements.

Figure 6:
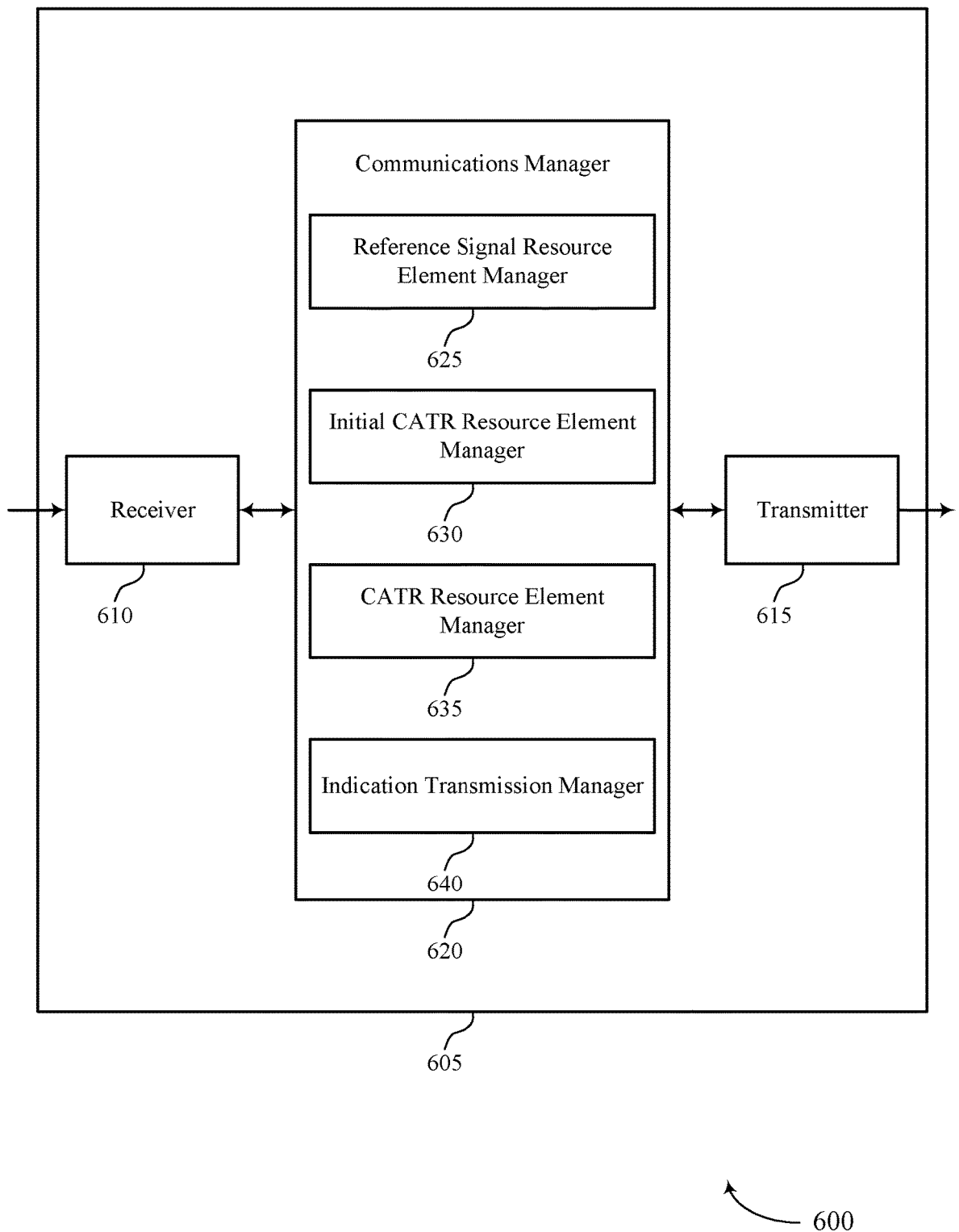

FIG. 6 illustrates a diagram 600 of a device 605 that supports schemes for channel aware tone reservation contention with reference signals in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of schemes for channel aware tone reservation contention with reference signals as described herein. For example, the communications manager 620 may include a reference signal resource element manager 625, an initial CATR resource element manager 630, a CATR resource element manager 635, an indication transmission manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a network entity in accordance with examples as disclosed herein. The reference signal resource element manager 625 may be configured as or otherwise support a means for determining, based on a reference signal pattern, a reference signal resource element within a first slot of a channel for transmitting a reference signal. The initial CATR resource element manager 630 may be configured as or otherwise support a means for determining, based on a CATR pattern, an initial CATR resource element for a tone reservation, the CATR pattern based on a channel frequency response of the channel. The CATR resource element manager 635 may be configured as or otherwise support a means for determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element. The indication transmission manager 640 may be configured as or otherwise support a means for transmitting an indication of the CATR resource element to a UE.

Figure 7:
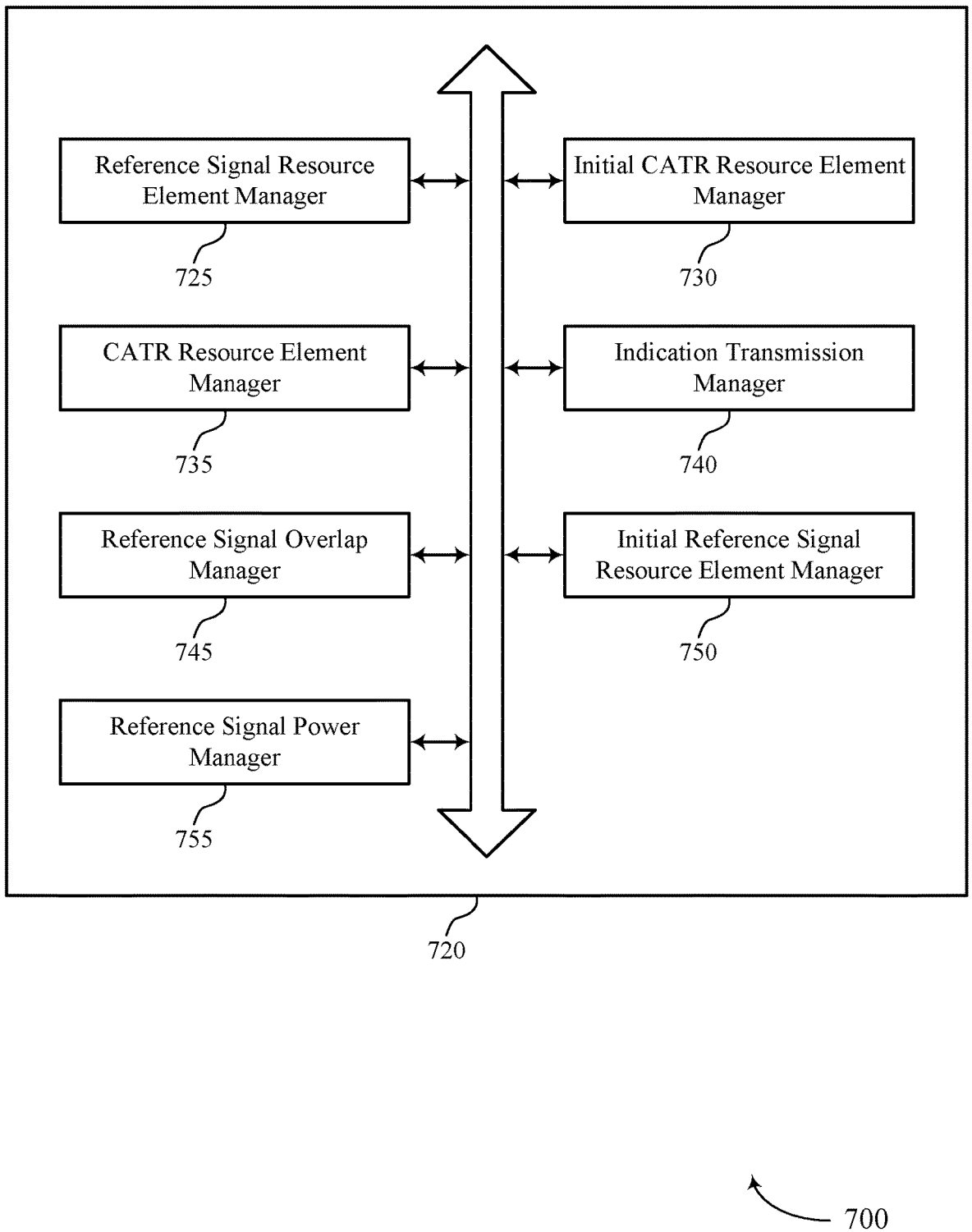
FIG. 7 illustrates a diagram of a communications manager that supports schemes for CATR contention with reference signals in accordance with one or more aspects of the present disclosure.

FIG. 7 illustrates a diagram 700 of a communications manager 720 that supports schemes for channel aware tone reservation contention with reference signals in accordance with one or more aspects of the present disclosure. The communications manager 720 may be an example of aspects of a communications manager 520, a communications manager 620, or both, as described herein. The communications manager 720, or various components thereof, may be an example of means for performing various aspects of schemes for channel aware tone reservation contention with reference signals as described herein. For example, the communications manager 720 may include a reference signal resource element manager 725, an initial CATR resource element manager 730, a CATR resource element manager 735, an indication transmission manager 740, a reference signal overlap manager 745, an initial reference signal resource element manager 750, a reference signal power manager 755, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a network entity in accordance with examples as disclosed herein. The reference signal resource element manager 725 may be configured as or otherwise support a means for determining, based on a reference signal pattern, a reference signal resource element within a first slot of a channel for transmitting a reference signal. The initial CATR resource element manager 730 may be configured as or otherwise support a means for determining, based on a CATR pattern, an initial CATR resource element for a tone reservation, the CATR pattern based on a channel frequency response of the channel. The CATR resource element manager 735 may be configured as or otherwise support a means for determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element. The indication transmission manager 740 may be configured as or otherwise support a means for transmitting an indication of the CATR resource element to a UE.

In some examples, to support determining the CATR resource element, the initial CATR resource element manager 730 may be configured as or otherwise support a means for determining the initial CATR resource element. In some examples, to support determining the CATR resource element, the reference signal overlap manager 745 may be configured as or otherwise support a means for determining that the reference signal resource element overlaps with the initial CATR resource element based on the reference signal resource element and the initial CATR resource element. In some examples, to support determining the CATR resource element, the CATR resource element manager 735 may be configured as or otherwise support a means for determining a modified CATR resource element as the CATR resource element.

In some examples, to support determining the CATR resource element, the CATR resource element manager 735 may be configured as or otherwise support a means for determining the initial CATR resource element within the first slot. In some examples, to support determining the CATR resource element, the reference signal overlap manager 745 may be configured as or otherwise support a means for determining that the reference signal resource element overlaps with the initial CATR resource element based on the reference signal resource element in the first slot and the initial CATR resource element in the first slot. In some examples, to support determining the CATR resource element, the CATR resource element manager 735 may be configured as or otherwise support a means for determining a modified CATR resource element as the CATR resource element, the modified CATR resource element including a resource element in the first slot that is different than the reference signal resource element.

In some examples, determining the resource element in the first slot is based on the resource element including data or the resource element including the reference signal multiplexed with data.

In some examples, to support determining the CATR resource element, the initial reference signal resource element manager 750 may be configured as or otherwise support a means for determining an initial reference signal resource element within the first slot. In some examples, to support determining the CATR resource element, the initial CATR resource element manager 730 may be configured as or otherwise support a means for determining an initial CATR resource element within the first slot. In some examples, to support determining the CATR resource element, the reference signal overlap manager 745 may be configured as or otherwise support a means for determining that the initial reference signal resource element overlaps with the initial CATR resource element based on the initial reference signal resource element in the first slot and the initial CATR resource element in the first slot. In some examples, to support determining the CATR resource element, the CATR resource element manager 735 may be configured as or otherwise support a means for determining the initial CATR resource element as the CATR resource element. In some examples, to support determining the CATR resource element, the reference signal resource element manager 725 may be configured as or otherwise support a means for determining a modified reference signal resource element as the reference signal resource element.

In some examples, the modified reference signal resource element is based on a modified reference signal pattern, the modified reference signal pattern adjusted dynamically based on the CATR resource element, an indication of a channel quality estimation, or both.

In some examples, determining the modified reference signal resource element includes adjusting a power level associated with the reference signal at the initial reference signal resource element.

In some examples, determining the modified reference signal resource element includes selecting a new reference signal resource element based on the reference signal pattern.

In some examples, to support determining the CATR resource element, the initial CATR resource element manager 730 may be configured as or otherwise support a means for determining an initial CATR resource element within the first slot. In some examples, to support determining the CATR resource element, the reference signal overlap manager 745 may be configured as or otherwise support a means for determining that the reference signal resource element overlaps with the initial CATR resource element. In some examples, to support determining the CATR resource element, the CATR resource element manager 735 may be configured as or otherwise support a means for determining the initial CATR resource element as the CATR resource element without modifying the initial CATR resource element.

In some examples, the CATR at the CATR resource element punctures the reference signal at the reference signal resource element.

In some examples, the reference signal at the reference signal resource element punctures the CATR at the CATR resource element.

In some examples, to support determining the CATR resource element, the reference signal overlap manager 745 may be configured as or otherwise support a means for determining that the reference signal resource element overlaps with the initial CATR resource element. In some examples, to support determining the CATR resource element, the CATR resource element manager 735 may be configured as or otherwise support a means for determining a resource element different than the reference signal resource element as the CATR resource element. In some examples, to support determining the CATR resource element, the reference signal power manager 755 may be configured as or otherwise support a means for adjusting a power level associated with the reference signal at the reference signal resource element.

Figure 8:
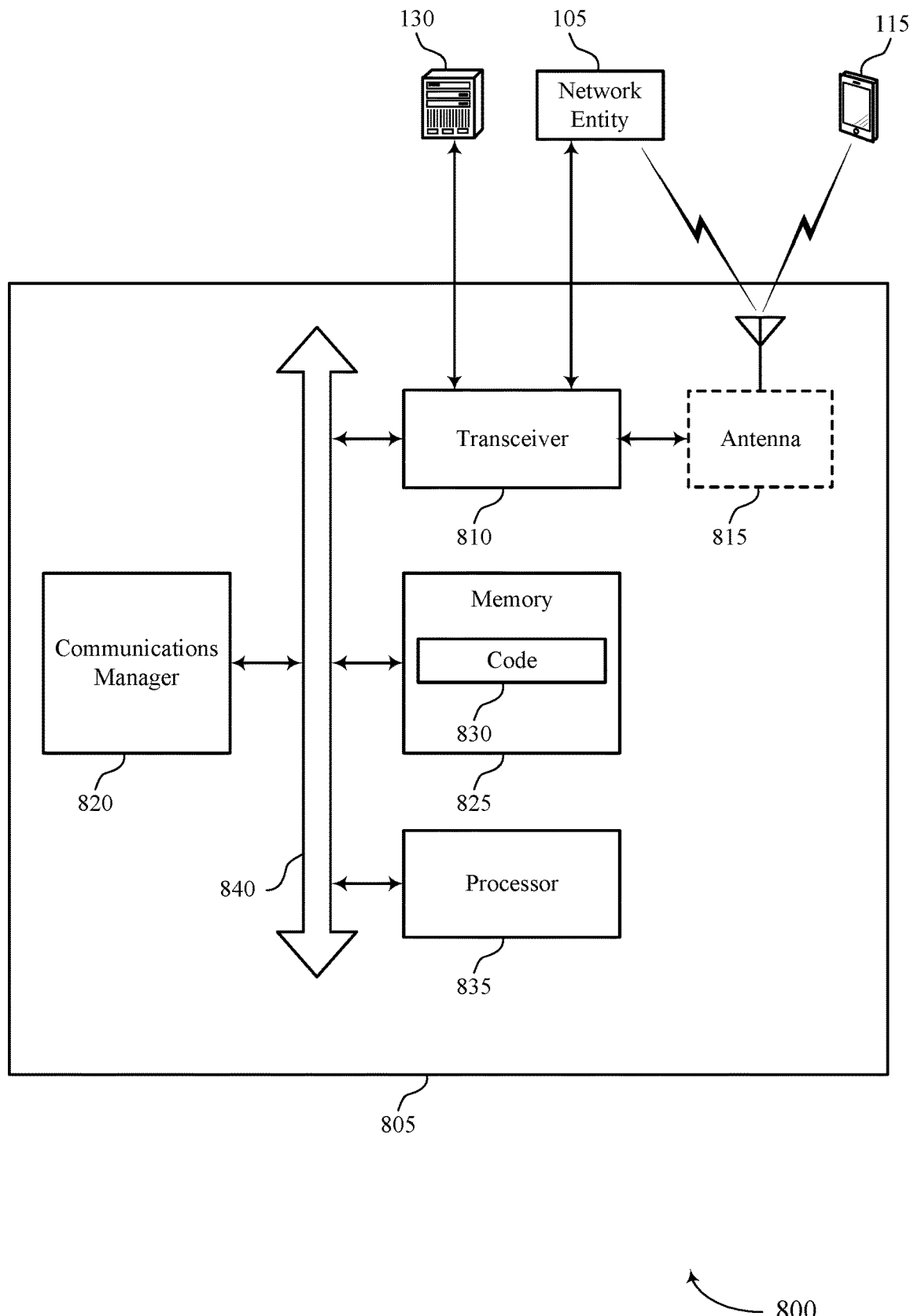
FIG. 8 illustrates a diagram of a system including a device that supports schemes for CATR contention with reference signals in accordance with one or more aspects of the present disclosure.

FIG. 8 illustrates a diagram of a system 800 including a device 805 that supports schemes for channel aware tone reservation contention with reference signals in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting schemes for channel aware tone reservation contention with reference signals). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a network entity in accordance with examples as disclosed herein. For example, the communications manager 820 may be configured as or otherwise support a means for determining, based on a reference signal pattern, a reference signal resource element within a first slot of a channel for transmitting a reference signal. The communications manager 820 may be configured as or otherwise support a means for determining, based on a CATR pattern, an initial CATR resource element for a tone reservation, the CATR pattern based on a channel frequency response of the channel. The communications manager 820 may be configured as or otherwise support a means for determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element. The communications manager 820 may be configured as or otherwise support a means for transmitting an indication of the CATR resource element to a UE.

By including or configuring the communications manager 820 in accordance with examples as described herein, the device 805 may support techniques for reducing or preventing potential channel estimation degradation otherwise caused by CATR resource elements colliding with reference signal resource elements.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of schemes for channel aware tone reservation contention with reference signals as described herein, or the processor 835 and the memory 825 may be otherwise configured to perform or support such operations.

Figure 9:
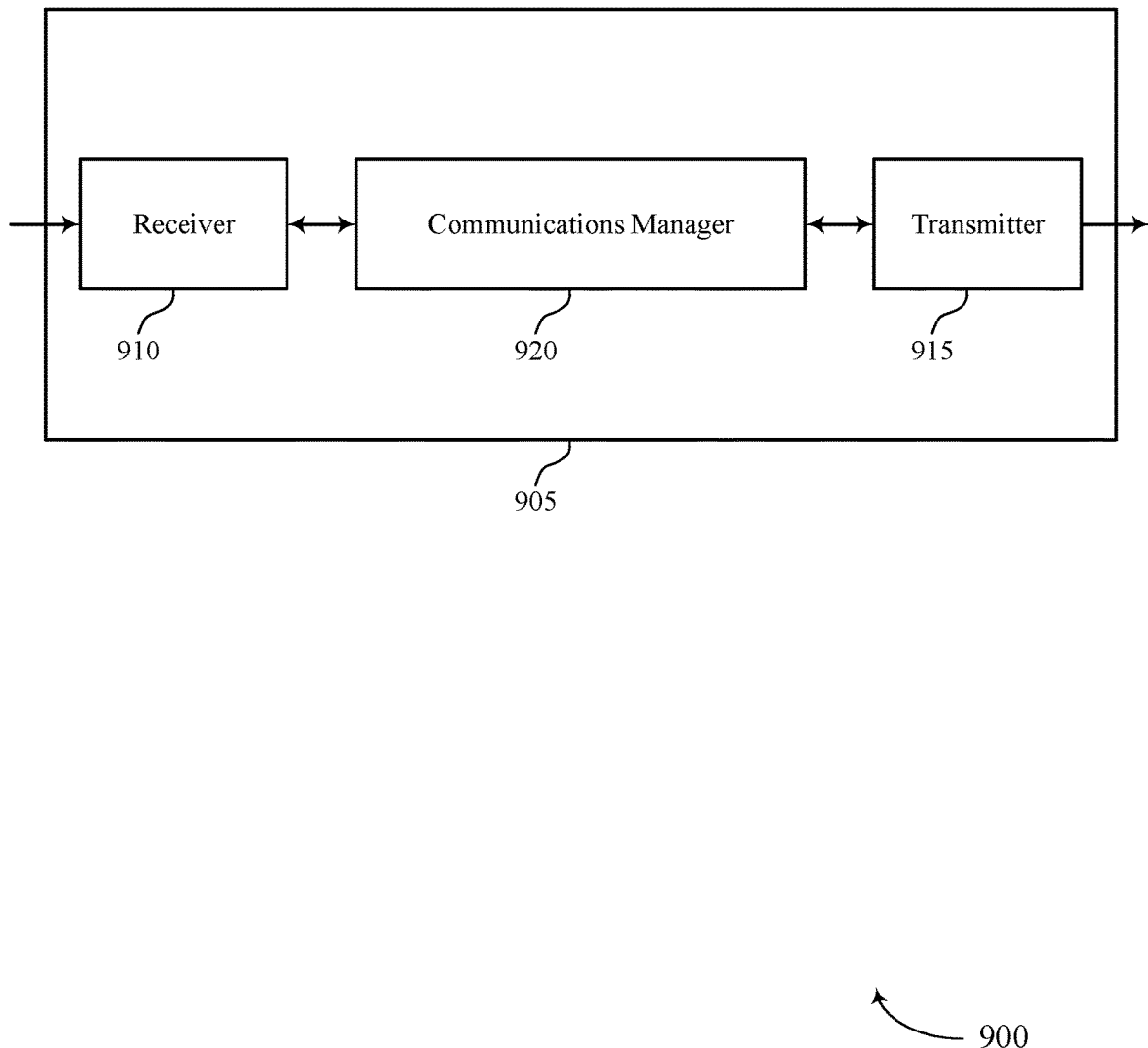
FIGS. 9 and 10 illustrate diagrams of devices that support schemes for CATR contention with reference signals in accordance with one or more aspects of the present disclosure.

FIG. 9 illustrates a diagram 900 of a device 905 that supports schemes for channel aware tone reservation contention with reference signals in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to schemes for channel aware tone reservation contention with reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to schemes for channel aware tone reservation contention with reference signals). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of schemes for channel aware tone reservation contention with reference signals as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 may be configured as or otherwise support a means for receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap. The communications manager 920 may be configured as or otherwise support a means for performing a channel quality estimation based on the CATR at the CATR resource element and the reference signal at the reference signal resource element. The communications manager 920 may be configured as or otherwise support a means for transmitting the channel quality estimation to the network entity.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reducing or preventing potential signal degradation otherwise caused by CATR resource elements colliding with reference signal resource elements.

Figure 10:
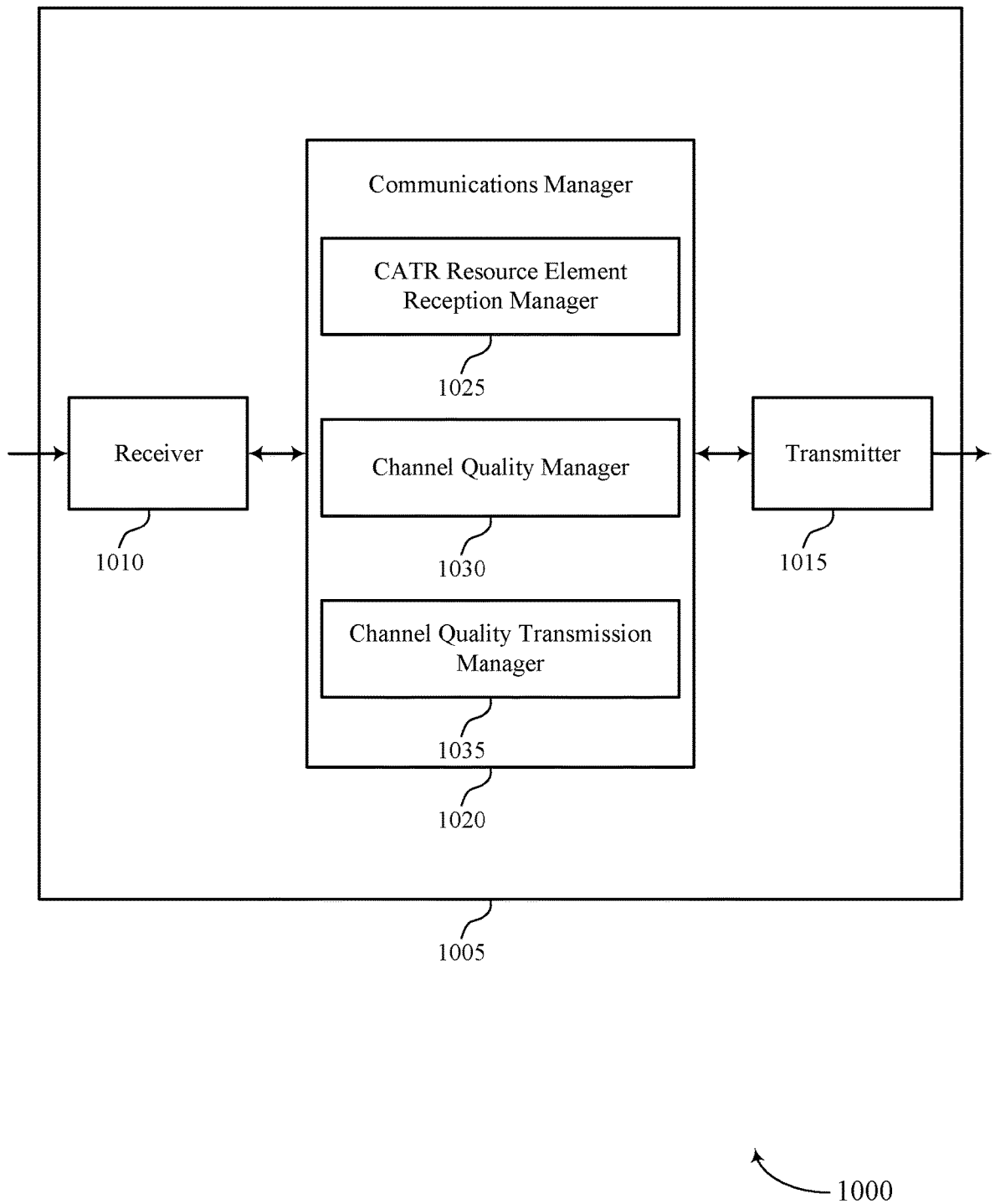

FIG. 10 illustrates a diagram 1000 of a device 1005 that supports schemes for channel aware tone reservation contention with reference signals in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to schemes for channel aware tone reservation contention with reference signals). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to schemes for channel aware tone reservation contention with reference signals). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of schemes for channel aware tone reservation contention with reference signals as described herein. For example, the communications manager 1020 may include a CATR resource element reception manager 1025, a channel quality manager 1030, a channel quality transmission manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The CATR resource element reception manager 1025 may be configured as or otherwise support a means for receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap. The channel quality manager 1030 may be configured as or otherwise support a means for performing a channel quality estimation based on the CATR at the CATR resource element and the reference signal at the reference signal resource element. The channel quality transmission manager 1035 may be configured as or otherwise support a means for transmitting the channel quality estimation to the network entity.

Figure 11:
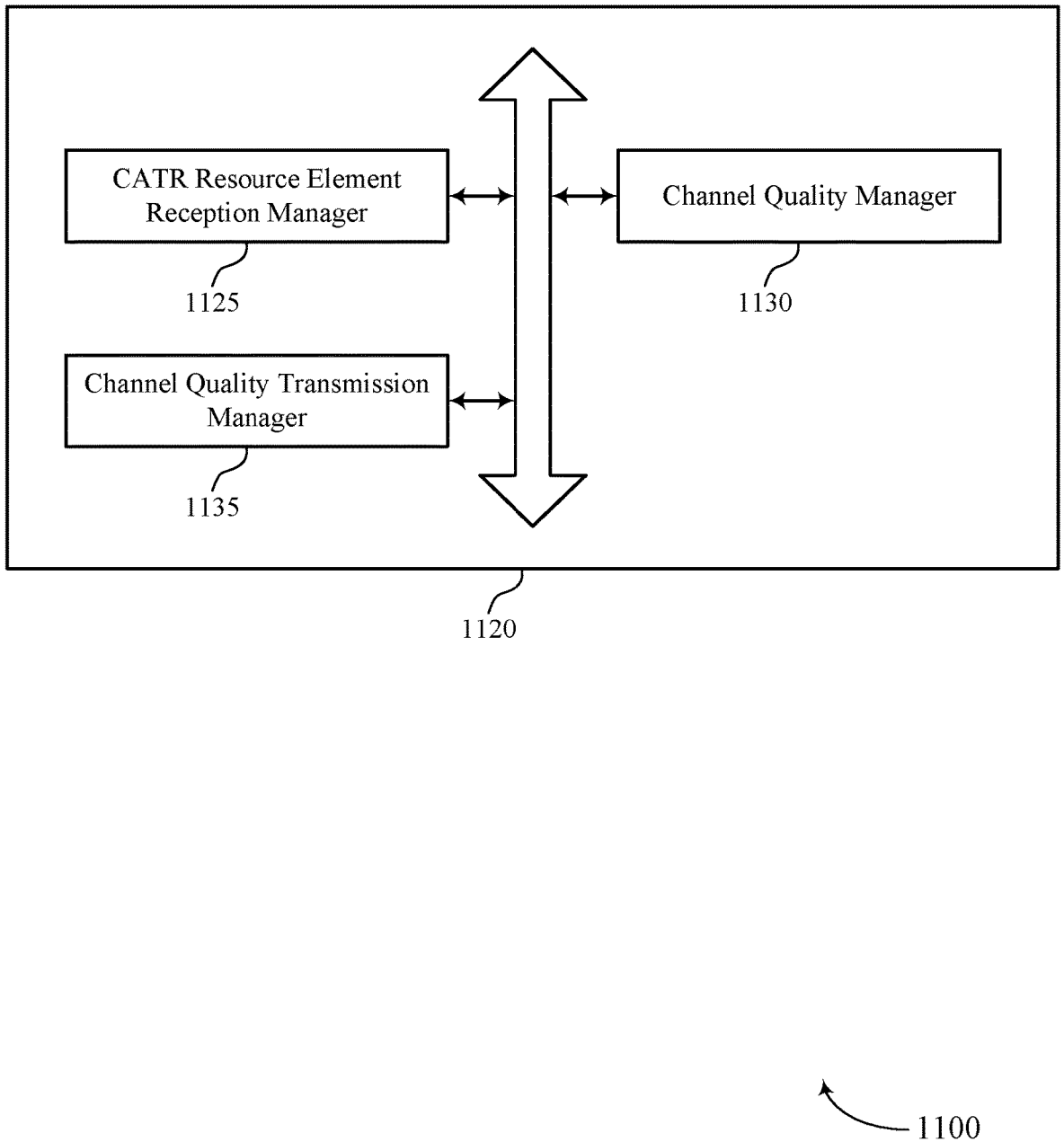
FIG. 11 illustrates a diagram of a communications manager that supports schemes for CATR contention with reference signals in accordance with one or more aspects of the present disclosure.

FIG. 11 illustrates a diagram 1100 of a communications manager 1120 that supports schemes for channel aware tone reservation contention with reference signals in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of schemes for channel aware tone reservation contention with reference signals as described herein. For example, the communications manager 1120 may include a CATR resource element reception manager 1125, a channel quality manager 1130, a channel quality transmission manager 1135, or any combination thereof. Each of these components may communicate, directly or indirectly, with one another (e.g., via one or more buses).

The communications manager 1120 may support wireless communications at a UE in accordance with examples as disclosed herein. The CATR resource element reception manager 1125 may be configured as or otherwise support a means for receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap. The channel quality manager 1130 may be configured as or otherwise support a means for performing a channel quality estimation based on the CATR at the CATR resource element and the reference signal at the reference signal resource element. The channel quality transmission manager 1135 may be configured as or otherwise support a means for transmitting the channel quality estimation to the network entity.

In some examples, to support receiving, from the network entity, the signal indicating the CATR resource element, the CATR resource element reception manager 1125 may be configured as or otherwise support a means for receiving the signal indicating the CATR resource element based on the initial CATR resource element within the first slot. In some examples, to support receiving, from the network entity, the signal indicating the CATR resource element, the CATR resource element reception manager 1125 may be configured as or otherwise support a means for receiving the signal indicating the CATR resource element based on the reference signal resource element overlapping with the initial CATR resource element based on the reference signal resource element in the first slot and the initial CATR resource element in the first slot. In some examples, to support receiving, from the network entity, the signal indicating the CATR resource element, the CATR resource element reception manager 1125 may be configured as or otherwise support a means for receiving the signal indicating the CATR resource element based on a modified CATR resource element as the CATR resource element, the modified CATR resource element including a resource element in a second slot different than the first slot.

In some examples, to support receiving, from the network entity, the signal indicating the CATR resource element, the CATR resource element reception manager 1125 may be configured as or otherwise support a means for receiving the signal indicating the CATR resource element is based on the initial CATR resource element within the first slot. In some examples, to support receiving, from the network entity, the signal indicating the CATR resource element, the CATR resource element reception manager 1125 may be configured as or otherwise support a means for receiving the signal indicating the CATR resource element is based on the reference signal resource element overlapping with the initial CATR resource element based on the reference signal resource element in the first slot and the initial CATR resource element in the first slot. In some examples, to support receiving, from the network entity, the signal indicating the CATR resource element, the CATR resource element reception manager 1125 may be configured as or otherwise support a means for receiving the signal indicating the CATR resource element is based on a modified CATR resource element as the CATR resource element, the modified CATR resource element including a resource element in the first slot that is different than the reference signal resource element.

In some examples, receiving the signal indicating the CATR resource element is based on the initial CATR resource element within the first slot based on the resource element including data or the resource element including the reference signal multiplexed with data.

In some examples, to support receiving, from the network entity, the signal indicating the CATR resource element, the CATR resource element reception manager 1125 may be configured as or otherwise support a means for receiving the signal indicating the CATR resource element based on an initial reference signal resource element within the first slot. In some examples, to support receiving, from the network entity, the signal indicating the CATR resource element, the CATR resource element reception manager 1125 may be configured as or otherwise support a means for receiving the signal indicating the CATR resource element based on an initial CATR resource element within the first slot. In some examples, to support receiving, from the network entity, the signal indicating the CATR resource element, the CATR resource element reception manager 1125 may be configured as or otherwise support a means for receiving the signal indicating the CATR resource element based on the initial reference signal resource element overlapping with the initial CATR resource element based on the initial reference signal resource element in the first slot and the initial CATR resource element in the first slot. In some examples, to support receiving, from the network entity, the signal indicating the CATR resource element, the CATR resource element reception manager 1125 may be configured as or otherwise support a means for receiving the signal indicating the CATR resource element based on the initial CATR resource element as the CATR resource element. In some examples, to support receiving, from the network entity, the signal indicating the CATR resource element, the CATR resource element reception manager 1125 may be configured as or otherwise support a means for receiving the signal indicating the CATR resource element based on a modified reference signal resource element as the reference signal resource element.

In some examples, the modified reference signal resource element is based on a modified reference signal pattern, the modified reference signal pattern adjusted dynamically based on the CATR resource element, an indication of the channel quality estimation, or both.

In some examples, receiving the signal indicating the CATR resource element based on the modified reference signal resource element including adjusting a power level associated with the reference signal at the initial reference signal resource element.

In some examples, receiving the signal indicating the CATR resource element based on the modified reference signal resource element including selection of a new reference signal resource element based on a reference signal pattern.

In some examples, to support receiving, from the network entity, the signal indicating the CATR resource element, the CATR resource element reception manager 1125 may be configured as or otherwise support a means for receiving the signal indicating the CATR resource element based on an initial CATR resource element within the first slot. In some examples, to support receiving, from the network entity, the signal indicating the CATR resource element, the CATR resource element reception manager 1125 may be configured as or otherwise support a means for receiving the signal indicating the CATR resource element based on the reference signal resource element overlapping with the initial CATR resource element. In some examples, to support receiving, from the network entity, the signal indicating the CATR resource element, the CATR resource element reception manager 1125 may be configured as or otherwise support a means for receiving the signal indicating the CATR resource element based on the initial CATR resource element as the CATR resource element without a modification of the initial CATR resource element.

In some examples, the CATR at the CATR resource element punctures the reference signal at the reference signal resource element.

In some examples, the reference signal at the reference signal resource element punctures the CATR at the CATR resource element.

Figure 12:
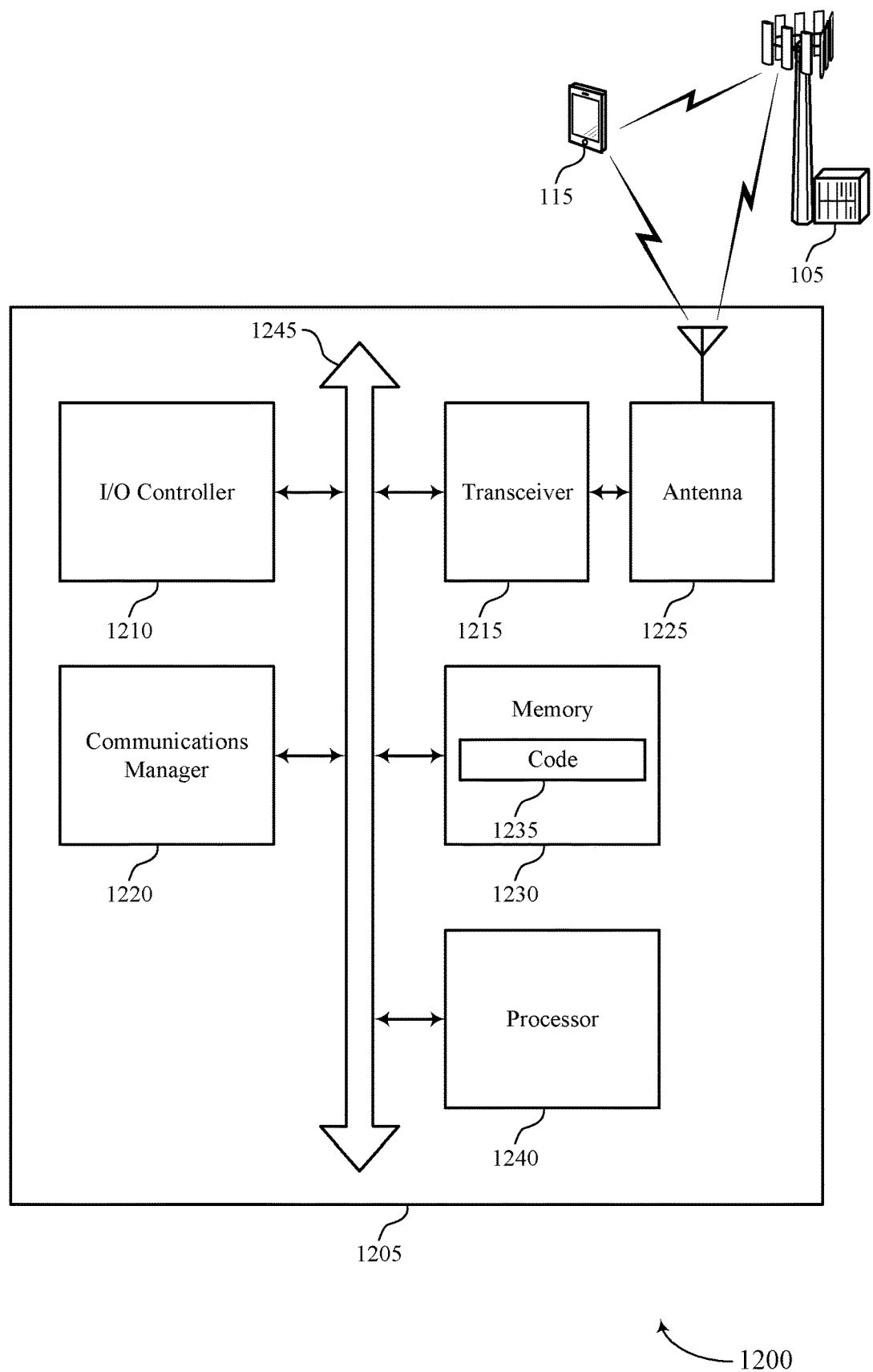
FIG. 12 illustrates a diagram of a system including a device that supports schemes for CATR contention with reference signals in accordance with one or more aspects of the present disclosure.

FIG. 12 illustrates a diagram of a system 1200 including a device 1205 that supports schemes for channel aware tone reservation contention with reference signals in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting schemes for channel aware tone reservation contention with reference signals). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap. The communications manager 1220 may be configured as or otherwise support a means for performing a channel quality estimation based on the CATR at the CATR resource element and the reference signal at the reference signal resource element. The communications manager 1220 may be configured as or otherwise support a means for transmitting the channel quality estimation to the network entity.

By including or configuring the communications manager 1220 in accordance with examples as described herein, the device 1205 may support techniques for reducing or preventing potential channel estimation degradation otherwise caused by CATR resource elements colliding with reference signal resource elements.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of schemes for channel aware tone reservation contention with reference signals as described herein, or the processor 1240 and the memory 1230 may be otherwise configured to perform or support such operations.

Figure 13:
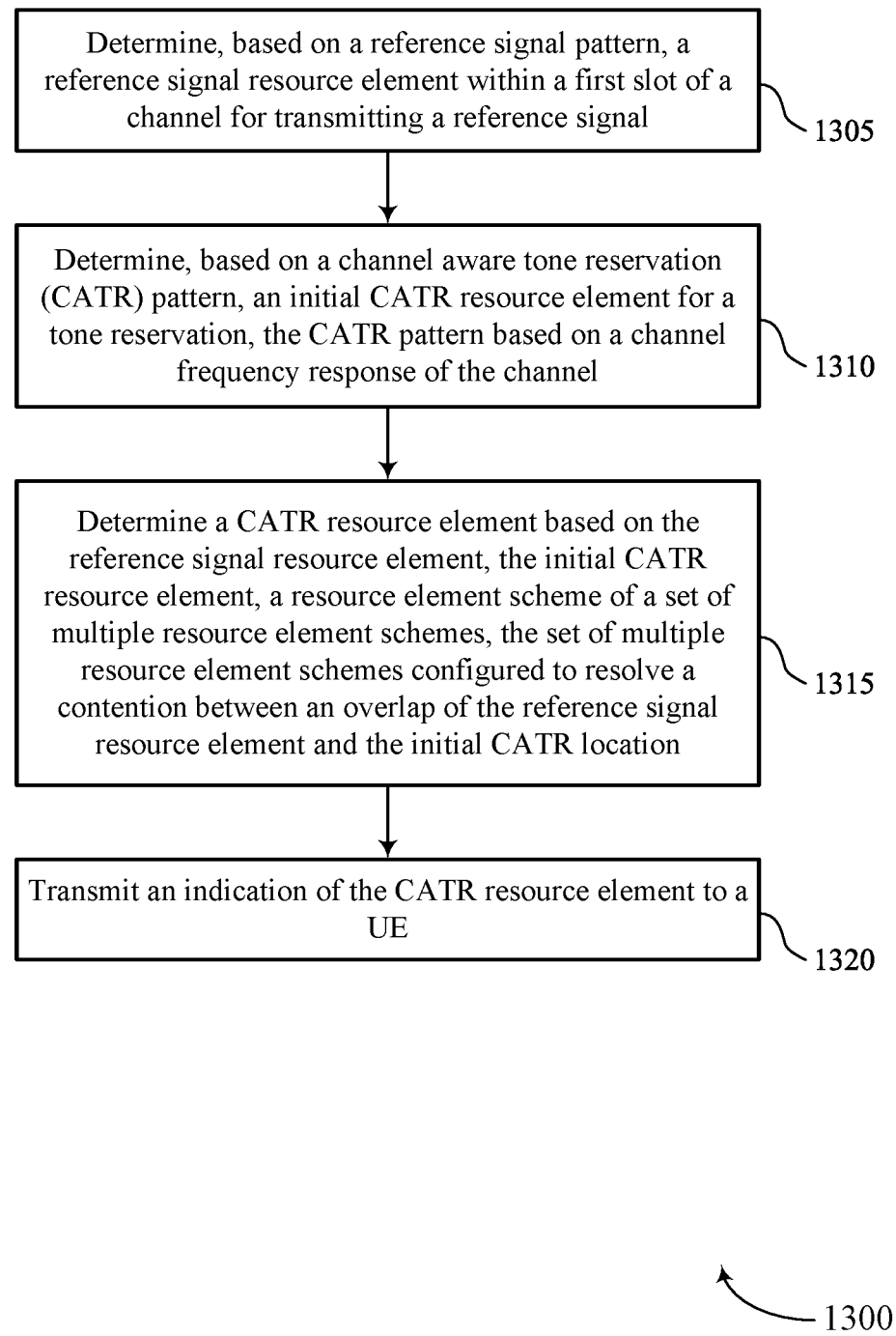
FIGS. 13 and 14 illustrate flowcharts showing methods that support schemes for CATR contention with reference signals in accordance with one or more aspects of the present disclosure.

FIG. 13 illustrates a flowchart showing a method 1300 that supports schemes for channel aware tone reservation contention with reference signals in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include determining, based on a reference signal pattern, a reference signal resource element within a first slot of a channel for transmitting a reference signal. The operations of 1305 may be performed in accordance with examples as disclosed herein. In some examples, aspects of the operations of 1305 may be performed by a reference signal resource element manager 725 as described with reference to FIG. 7.

At 1310, the method may include determining, based on a CATR pattern, an initial CATR resource element for a tone reservation, the CATR pattern based on a channel frequency response of the channel. The operations of 1310 may be performed in accordance with examples as disclosed herein. In some examples, aspects of the operations of 1310 may be performed by an initial CATR resource element manager 730 as described with reference to FIG. 7.

At 1315, the method may include determining a CATR resource element based on the reference signal resource element, the initial CATR resource element, a resource element scheme of a set of multiple resource element schemes, the set of multiple resource element schemes configured to resolve a contention between an overlap of the reference signal resource element and the initial CATR resource element. The operations of 1315 may be performed in accordance with examples as disclosed herein. In some examples, aspects of the operations of 1315 may be performed by a CATR resource element manager 735 as described with reference to FIG. 7.

At 1320, the method may include transmitting an indication of the CATR resource element to a UE. The operations of 1320 may be performed in accordance with examples as disclosed herein. In some examples, aspects of the operations of 1320 may be performed by an indication transmission manager 740 as described with reference to FIG. 7.

Figure 14:
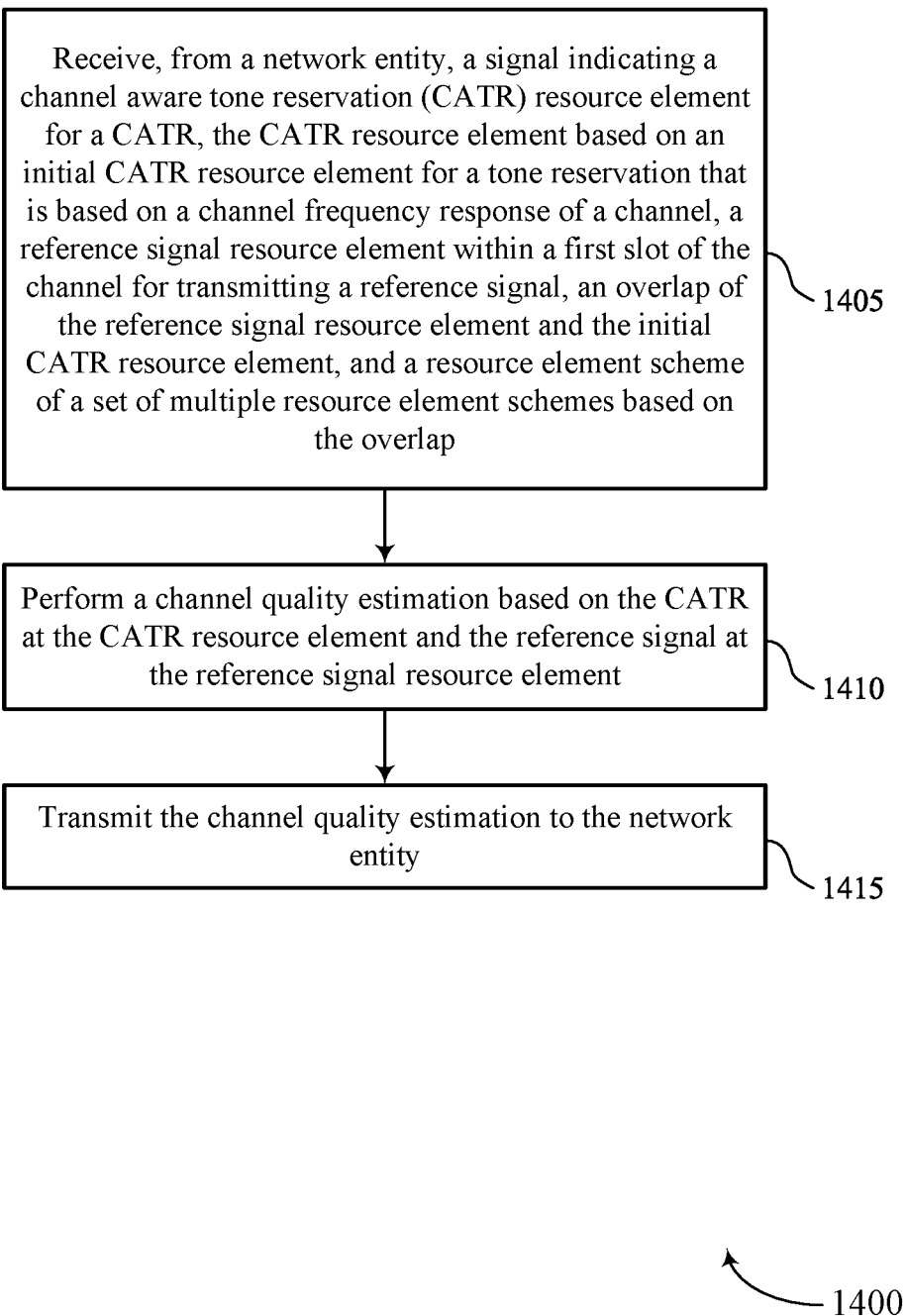

FIG. 14 illustrates a flowchart showing a method 1400 that supports schemes for channel aware tone reservation contention with reference signals in accordance with one or more aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, a signal indicating a CATR resource element for a CATR, the CATR resource element based on an initial CATR resource element for a tone reservation that is based on a channel frequency response of a channel, a reference signal resource element within a first slot of the channel for transmitting a reference signal, an overlap of the reference signal resource element and the initial CATR resource element, and a resource element scheme of a set of multiple resource element schemes based on the overlap. The operations of 1405 may be performed in accordance with examples as disclosed herein. In some examples, aspects of the operations of 1405 may be performed by a CATR resource element reception manager 1125 as described with reference to FIG. 11.

At 1410, the method may include performing a channel quality estimation based on the CATR at the CATR resource element and the reference signal at the reference signal resource element. The operations of 1410 may be performed in accordance with examples as disclosed herein. In some examples, aspects of the operations of 1410 may be performed by a channel quality manager 1130 as described with reference to FIG. 11.

At 1415, the method may include transmitting the channel quality estimation to the network entity. The operations of 1415 may be performed in accordance with examples as disclosed herein. In some examples, aspects of the operations of 1415 may be performed by a channel quality transmission manager 1135 as described with reference to FIG. 11.

The following provides an overview of aspects of the present disclosure:

Aspect 1: A method for wireless communications at a network entity, comprising: determining, based at least in part on a reference signal pattern, a reference signal resource element within a first slot of a channel for transmitting a reference signal: determining, based at least in part on a CATR pattern, an initial CATR resource element for a tone reservation, the CATR pattern based at least in part on a channel frequency response of the channel: determining a CATR resource element based at least in part on the reference signal resource element, the initial CATR resource element, a resource element scheme of a plurality of resource element schemes, the plurality of resource element schemes configured to resolve a contention between an overlap of the reference signal resource element and the initial CATR resource element: and transmitting an indication of the CATR resource element to a UE.

Aspect 2: The method of aspect 1, wherein determining the CATR resource element comprises: determining the initial CATR resource element: determining that the reference signal resource element overlaps with the initial CATR resource element based at least in part on the reference signal resource element and the initial CATR resource element: and determining a modified CATR resource element as the CATR resource element.

Aspect 3: The method of any of aspects 1 through 2, wherein determining the CATR resource element comprises: determining the initial CATR resource element within the first slot; determining that the reference signal resource element overlaps with the initial CATR resource element based at least in part on the reference signal resource element in the first slot and the initial CATR resource element in the first slot; and determining a modified CATR resource element as the CATR resource element, the modified CATR resource element comprising a resource element in the first slot that is different than the reference signal resource element.

Aspect 4: The method of aspect 3, wherein determining the resource element in the first slot is based at least in part on the resource element comprising data or the resource element comprising the reference signal multiplexed with data.

Aspect 5: The method of any of aspects 1 through 4, wherein determining the CATR resource element comprises: determining an initial reference signal resource element within the first slot; determining the initial CATR resource element within the first slot; determining that the initial reference signal resource element overlaps with the initial CATR resource element based at least in part on the initial reference signal resource element in the first slot and the initial CATR resource element in the first slot; determining the initial CATR resource element as the CATR resource element: and determining a modified reference signal resource element as the reference signal resource element.

Aspect 6: The method of aspect 5, wherein the modified reference signal resource element is based at least in part on a modified reference signal pattern, the modified reference signal pattern adjusted dynamically based at least in part on the CATR resource element, an indication of a channel quality estimation, or both.

Aspect 7: The method of any of aspects 5 through 6, wherein determining the modified reference signal resource element comprises adjusting a power level associated with the reference signal at the initial reference signal resource element.

Aspect 8: The method of any of aspects 5 through 7, wherein determining the modified reference signal resource element comprises selecting a new reference signal resource element based at least in part on the reference signal pattern.

Aspect 9: The method of any of aspects 1 through 8, wherein determining the CATR resource element comprises: determining the initial CATR resource element within the first slot; determining that the reference signal resource element overlaps with the initial CATR resource element:

and determining the initial CATR resource element as the CATR resource element without modifying the initial CATR resource element.

Aspect 10: The method of aspect 9, wherein a CATR at the CATR resource element punctures the reference signal at the reference signal resource element.

Aspect 11: The method of any of aspects 9 through 10, wherein the reference signal at the reference signal resource element punctures a CATR at the CATR resource element.

Aspect 12: The method of any of aspects 1 through 11, wherein determining the CATR resource element comprises: determining that the reference signal resource element overlaps with the initial CATR resource element: determining a resource element different than the reference signal resource element as the CATR resource element: and adjusting a power level associated with the reference signal at the reference signal resource element.

Aspect 13: A method for wireless communications at a UE, comprising: receiving, from a network entity, a signal indicating a channel aware tone reservation (CATR) resource element for a CATR, the CATR resource element based at least in part on an initial CATR resource element for a tone reservation that is based at least in part on a channel frequency response of a channel, a reference signal resource element within a first slot of the channel for transmitting a reference signal, an overlap of the reference signal resource element and the initial CATR resource element, and a resource element scheme of a plurality of resource element schemes based at least in part on the overlap: performing a channel quality estimation based at least in part on the CATR at the CATR resource element and the reference signal at the reference signal resource element: and transmitting the channel quality estimation to the network entity.

Aspect 14: The method of aspect 13, wherein receiving, from the network entity, the signal indicating the CATR resource element comprises: receiving the signal indicating the CATR resource element based at least in part on the initial CATR resource element within the first slot; receiving the signal indicating the CATR resource element based at least in part on the reference signal resource element overlapping with the initial CATR resource element based at least in part on the reference signal resource element in the first slot and the initial CATR resource element in the first slot; and receiving the signal indicating the CATR resource element based at least in part on a modified CATR resource element as the CATR resource element, the modified CATR resource element comprising a resource element in a second slot different than the first slot.

Aspect 15: The method of any of aspects 13 through 14, wherein receiving, from the network entity, the signal indicating the CATR resource element comprises: receiving the signal indicating the CATR resource element is based at least in part on the initial CATR resource element within the first slot; receiving the signal indicating the CATR resource element is based at least in part on the reference signal resource element overlapping with the initial CATR resource element based at least in part on the reference signal resource element in the first slot and the initial CATR resource element in the first slot; and receiving the signal indicating the CATR resource element is based at least in part on a modified CATR resource element as the CATR resource element, the modified CATR resource element comprising a resource element in the first slot that is different than the reference signal resource element.

Aspect 16: The method of aspect 15, wherein receiving the signal indicating the CATR resource element is based at least in part on the initial CATR resource element within the first slot based at least in part on the resource element comprising data or the resource element comprising the reference signal multiplexed with data.

Aspect 17: The method of any of aspects 13 through 16, wherein receiving, from the network entity, the signal indicating the CATR resource element comprises: receiving the signal indicating the CATR resource element based at least in part on an initial reference signal resource element within the first slot; receiving the signal indicating the CATR resource element based at least in part on the initial CATR resource element within the first slot; receiving the signal indicating the CATR resource element based at least in part on the initial reference signal resource element overlapping with the initial CATR resource element based at least in part on the initial reference signal resource element in the first slot and the initial CATR resource element in the first slot; receiving the signal indicating the CATR resource element based at least in part on the initial CATR resource element as the CATR resource element: and receiving the signal indicating the CATR resource element based at least in part on a modified reference signal resource element as the reference signal resource element.

Aspect 18: The method of aspect 17, wherein the modified reference signal resource element is based at least in part on a modified reference signal pattern, the modified reference signal pattern adjusted dynamically based at least in part on the CATR resource element, an indication of the channel quality estimation, or both.

Aspect 19: The method of any of aspects 17 through 18, wherein receiving the signal indicating the CATR resource element based at least in part on the modified reference signal resource element comprising adjusting a power level associated with the reference signal at the initial reference signal resource element.

Aspect 20: The method of any of aspects 17 through 19, wherein receiving the signal indicating the CATR resource element based at least in part on the modified reference signal resource element comprising selection of a new reference signal resource element based at least in part on a reference signal pattern.

Aspect 21: The method of any of aspects 13 through 20, wherein receiving, from the network entity, the signal indicating the CATR resource element comprises: receiving the signal indicating the CATR resource element based at least in part on the initial CATR resource element within the first slot; receiving the signal indicating the CATR resource element based at least in part on the reference signal resource element overlapping with the initial CATR resource element; and receiving the signal indicating the CATR resource element based at least in part on the initial CATR resource element as the CATR resource element without a modification of the initial CATR resource element.

Aspect 22: The method of any of aspects 13 through 21, wherein the CATR at the CATR resource element punctures the reference signal at the reference signal resource element.

Aspect 23: The method of any of aspects 13 through 22, wherein the reference signal at the reference signal resource element punctures the CATR at the CATR resource element.

Aspect 24: An apparatus for wireless communications at a network entity, comprising a processor; memory coupled with the processor; and instructions stored in the memory and executable by the processor to cause the apparatus to perform a method of any of aspects 1 through 12.

Aspect 25: An apparatus for wireless communications at a network entity, comprising at least one means for performing a method of any of aspects 1 through 12.

Aspect 26: A non-transitory computer-readable medium storing code for wireless communications at a network entity, the code comprising instructions executable by a processor to perform a method of any of aspects 1 through 12.

Aspect 27: An apparatus for wireless communications at a UE, comprising a processor; memory coupled with the processor; and instructions stored in the memory and executable by the processor to cause the apparatus to perform a method of any of aspects 13 through 23.

Aspect 28: An apparatus for wireless communications at a UE, comprising at least one means for performing a method of any of aspects 13 through 23.

Aspect 29: A non-transitory computer-readable medium storing code for wireless communications at a UE, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination: B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:
    determining, based at least in part on a reference signal pattern, a reference signal resource element within a first slot of a channel for transmitting a reference signal;
    determining, based at least in part on a channel aware tone reservation (CATR) pattern, an initial CATR resource element for a tone reservation, the CATR pattern based at least in part on a channel frequency response of the channel;
    determining a CATR resource element based at least in part on the reference signal resource element, the initial CATR resource element, a resource element scheme of a plurality of resource element schemes, the plurality of resource element schemes configured to resolve a contention between an overlap of the reference signal resource element and the initial CATR resource element; and
    transmitting an indication of the CATR resource element to a user equipment (UE).

2. The method of claim 1, wherein determining the CATR resource element comprises:
    determining the initial CATR resource element;
    determining that the reference signal resource element overlaps with the initial CATR resource element based at least in part on the reference signal resource element and the initial CATR resource element; and
    determining a modified CATR resource element as the CATR resource element.

3. The method of claim 1, wherein determining the CATR resource element comprises:
    determining the initial CATR resource element within the first slot;
    determining that the reference signal resource element overlaps with the initial CATR resource element based at least in part on the reference signal resource element in the first slot and the initial CATR resource element in the first slot; and
    determining a modified CATR resource element as the CATR resource element, the modified CATR resource element comprising a resource element in the first slot that is different than the reference signal resource element.

4. The method of claim 3, wherein determining the resource element in the first slot is based at least in part on the resource element comprising data or the resource element comprising the reference signal multiplexed with data.

5. The method of claim 1, wherein determining the CATR resource element comprises:
    determining an initial reference signal resource element within the first slot;
    determining the initial CATR resource element within the first slot;
    determining that the initial reference signal resource element overlaps with the initial CATR resource element based at least in part on the initial reference signal resource element in the first slot and the initial CATR resource element in the first slot;
    determining the initial CATR resource element as the CATR resource element; and
    determining a modified reference signal resource element as the reference signal resource element.

6. The method of claim 5, wherein the modified reference signal resource element is based at least in part on a modified reference signal pattern, the modified reference signal pattern adjusted dynamically based at least in part on the CATR resource element, an indication of a channel quality estimation, or both.

7. The method of claim 5, wherein determining the modified reference signal resource element comprises adjusting a power level associated with the reference signal at the initial reference signal resource element.

8. The method of claim 5, wherein determining the modified reference signal resource element comprises selecting a new reference signal resource element based at least in part on the reference signal pattern.

9. The method of claim 1, wherein determining the CATR resource element comprises:
    determining the initial CATR resource element within the first slot;
    determining that the reference signal resource element overlaps with the initial CATR resource element; and
    determining the initial CATR resource element as the CATR resource element without modifying the initial CATR resource element.

10. The method of claim 9, wherein a CATR at the CATR resource element punctures the reference signal at the reference signal resource element.

11. The method of claim 9, wherein the reference signal at the reference signal resource element punctures a CATR at the CATR resource element.

12. The method of claim 1, wherein determining the CATR resource element comprises:
    determining that the reference signal resource element overlaps with the initial CATR resource element;

determining a resource element different than the reference signal resource element as the CATR resource element; and adjusting a power level associated with the reference signal at the reference signal resource element.

13. A method for wireless communications at a user equipment (UE), comprising:

receiving, from a network entity, a signal indicating a channel aware tone reservation (CATR) resource element for a CATR, the CATR resource element based at least in part on an initial CATR resource element for a tone reservation that is based at least in part on a channel frequency response of a channel, a reference signal resource element within a first slot of the channel for transmitting a reference signal, an overlap of the reference signal resource element and the initial CATR resource element, and a resource element scheme of a plurality of resource element schemes based at least in part on the overlap;

performing a channel quality estimation based at least in part on the CATR at the CATR resource element and the reference signal at the reference signal resource element; and transmitting the channel quality estimation to the network entity.

14. The method of claim 13, wherein receiving, from the network entity, the signal indicating the CATR resource element comprises:

receiving the signal indicating the CATR resource element based at least in part on the initial CATR resource element within the first slot;

receiving the signal indicating the CATR resource element based at least in part on the reference signal resource element overlapping with the initial CATR resource element based at least in part on the reference signal resource element in the first slot and the initial CATR resource element in the first slot; and receiving the signal indicating the CATR resource element based at least in part on a modified CATR resource element as the CATR resource element, the modified CATR resource element comprising a resource element in a second slot different than the first slot.

15. The method of claim 13, wherein receiving, from the network entity, the signal indicating the CATR resource element comprises:

receiving the signal indicating the CATR resource element is based at least in part on the initial CATR resource element within the first slot;

receiving the signal indicating the CATR resource element is based at least in part on the reference signal resource element overlapping with the initial CATR resource element based at least in part on the reference signal resource element in the first slot and the initial CATR resource element in the first slot; and receiving the signal indicating the CATR resource element is based at least in part on a modified CATR resource element as the CATR resource element, the modified CATR resource element comprising a resource element in the first slot that is different than the reference signal resource element.

16. The method of claim 15, wherein receiving the signal indicating the CATR resource element is based at least in part on the initial CATR resource element within the first slot based at least in part on the resource element comprising data or the resource element comprising the reference signal multiplexed with data.

17. The method of claim 13, wherein receiving, from the network entity, the signal indicating the CATR resource element comprises:

receiving the signal indicating the CATR resource element based at least in part on an initial reference signal resource element within the first slot;

receiving the signal indicating the CATR resource element based at least in part on the initial CATR resource element within the first slot;

receiving the signal indicating the CATR resource element based at least in part on the initial reference signal resource element overlapping with the initial CATR resource element based at least in part on the initial reference signal resource element in the first slot and the initial CATR resource element in the first slot;

receiving the signal indicating the CATR resource element based at least in part on the initial CATR resource element as the CATR resource element; and receiving the signal indicating the CATR resource element based at least in part on a modified reference signal resource element as the reference signal resource element.

18. The method of claim 17, wherein the modified reference signal resource element is based at least in part on a modified reference signal pattern, the modified reference signal pattern adjusted dynamically based at least in part on the CATR resource element, an indication of the channel quality estimation, or both.

19. The method of claim 17, wherein receiving the signal indicating the CATR resource element based at least in part on the modified reference signal resource element comprising adjusting a power level associated with the reference signal at the initial reference signal resource element.

20. The method of claim 17, wherein receiving the signal indicating the CATR resource element based at least in part on the modified reference signal resource element comprising selection of a new reference signal resource element based at least in part on a reference signal pattern.

21. The method of claim 13, wherein receiving, from the network entity, the signal indicating the CATR resource element comprises:

receiving the signal indicating the CATR resource element based at least in part on the initial CATR resource element within the first slot;

receiving the signal indicating the CATR resource element based at least in part on the reference signal resource element overlapping with the initial CATR resource element; and receiving the signal indicating the CATR resource element based at least in part on the initial CATR resource element as the CATR resource element without a modification of the initial CATR resource element.

22. The method of claim 13, wherein the CATR at the CATR resource element punctures the reference signal at the reference signal resource element.

23. The method of claim 13, wherein the reference signal at the reference signal resource element punctures the CATR at the CATR resource element.

24. An apparatus for wireless communications at a network entity, comprising:

a processor;

memory coupled with the processor; and instructions stored in the memory and executable by the processor to cause the apparatus to:

determine, based at least in part on a reference signal pattern, a reference signal resource element within a first slot of a channel for transmitting a reference signal;

determine, based at least in part on a channel aware tone reservation (CATR) pattern, an initial CATR resource element for a tone reservation, the CATR pattern based at least in part on a channel frequency response of the channel;

determine a CATR resource element based at least in part on the reference signal resource element, the initial CATR resource element, a resource element scheme of a plurality of resource element schemes, the plurality of resource element schemes configured to resolve a contention between an overlap of the reference signal resource element and the initial CATR resource element; and transmit an indication of the CATR resource element to a user equipment (UE).

25. The apparatus of claim 24, wherein the instructions to determine the CATR resource element are executable by the processor to cause the apparatus to:

determine the initial CATR resource element;

determine that the reference signal resource element overlaps with the initial CATR resource element based at least in part on the reference signal resource element and the initial CATR resource element; and determine a modified CATR resource element as the CATR resource element.

26. The apparatus of claim 24, wherein the instructions to determine the CATR resource element are executable by the processor to cause the apparatus to:

determine the initial CATR resource element within the first slot;

determine that the reference signal resource element overlaps with the initial CATR resource element based at least in part on the reference signal resource element in the first slot and the initial CATR resource element in the first slot; and determine a modified CATR resource element as the CATR resource element, the modified CATR resource element comprising a resource element in the first slot that is different than the reference signal resource element.

27. The apparatus of claim 26, wherein determining the resource element in the first slot is based at least in part on the resource element comprising data or the resource element comprising the reference signal multiplexed with data.

28. The apparatus of claim 24, wherein the instructions to determine the CATR resource element are executable by the processor to cause the apparatus to:

determine an initial reference signal resource element within the first slot;

determine the initial CATR resource element within the first slot;

determine that the initial reference signal resource element overlaps with the initial CATR resource element based at least in part on the initial reference signal resource element in the first slot and the initial CATR resource element in the first slot;

determine the initial CATR resource element as the CATR resource element; and determine a modified reference signal resource element as the reference signal resource element.

29. The apparatus of claim 28, wherein the modified reference signal resource element is based at least in part on a modified reference signal pattern, the modified reference signal pattern adjusted dynamically based at least in part on the CATR resource element, an indication of a channel quality estimation, or both.

30. The apparatus of claim 28, wherein determining the modified reference signal resource element comprises adjusting a power level associated with the reference signal at the initial reference signal resource element.

* * * * *